Figure 1:
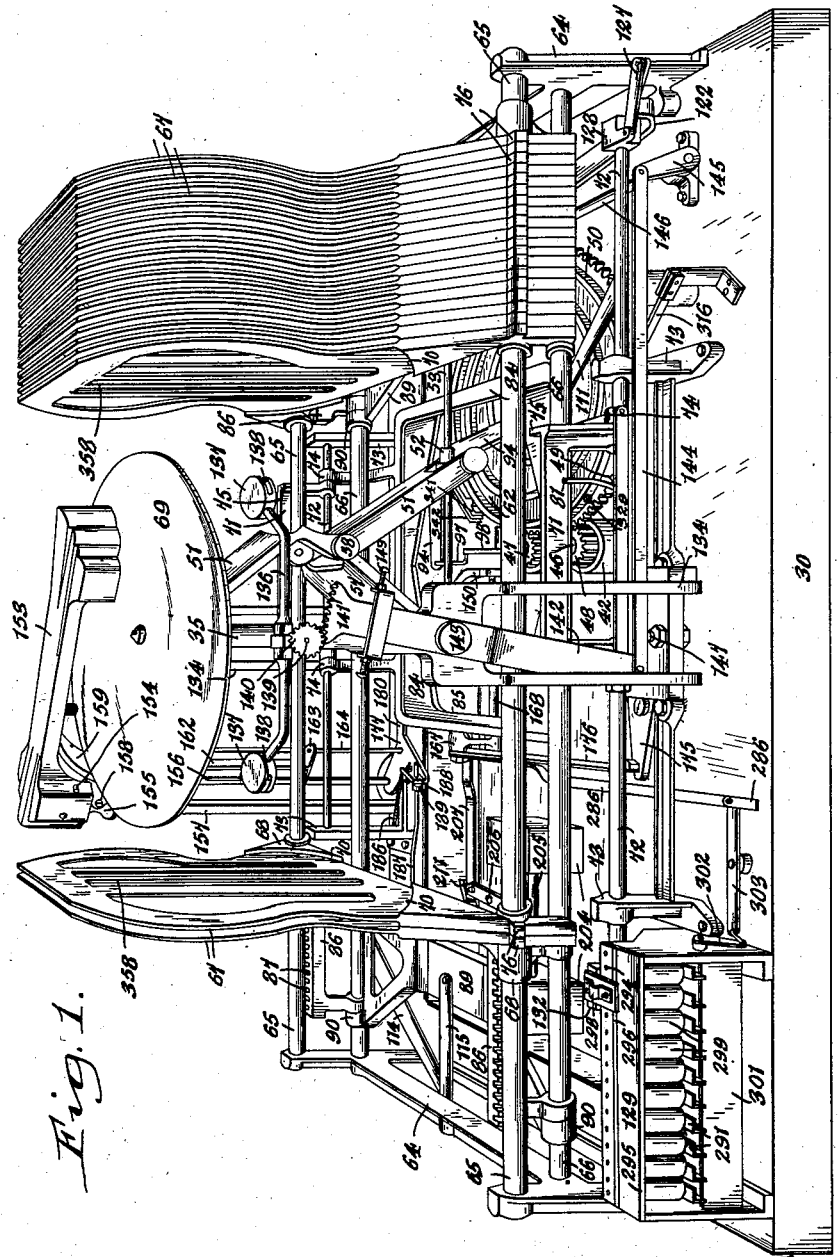

Oct. 13, 1942.  T. M. WRIGHT  2,298,447
AUTOMATIC PHONOGRAPH
Filed Jan. 10, 1939  20 Sheets-Sheet 1

Oct. 13, 1942.    T. M. WRIGHT    2,298,447
AUTOMATIC PHONOGRAPH
Filed Jan. 10, 1939    20 Sheets-Sheet 5

Oct. 13, 1942.　　T. M. WRIGHT　　2,298,447
AUTOMATIC PHONOGRAPH
Filed Jan. 10, 1939　　20 Sheets-Sheet 6

Inventor,
Theodore M. Wright,
by Walter P. Geyer
Attorney.

Oct. 13, 1942.  T. M. WRIGHT  2,298,447
AUTOMATIC PHONOGRAPH
Filed Jan. 10, 1939  20 Sheets-Sheet 8

Inventor,
Theodore M. Wright,
by Walter P. Geyer
Attorney.

Oct. 13, 1942.                T. M. WRIGHT                2,298,447
                           AUTOMATIC PHONOGRAPH
                           Filed Jan. 10, 1939        20 Sheets-Sheet 10

Fig. 10.

Inventor,
Theodore M. Wright,
by Walter P. Geyer
Attorney.

Oct. 13, 1942.   T. M. WRIGHT   2,298,447
AUTOMATIC PHONOGRAPH
Filed Jan. 10, 1939   20 Sheets-Sheet 11

Inventor,
Theodore M. Wright,
by Walter P. Geyer
Attorney.

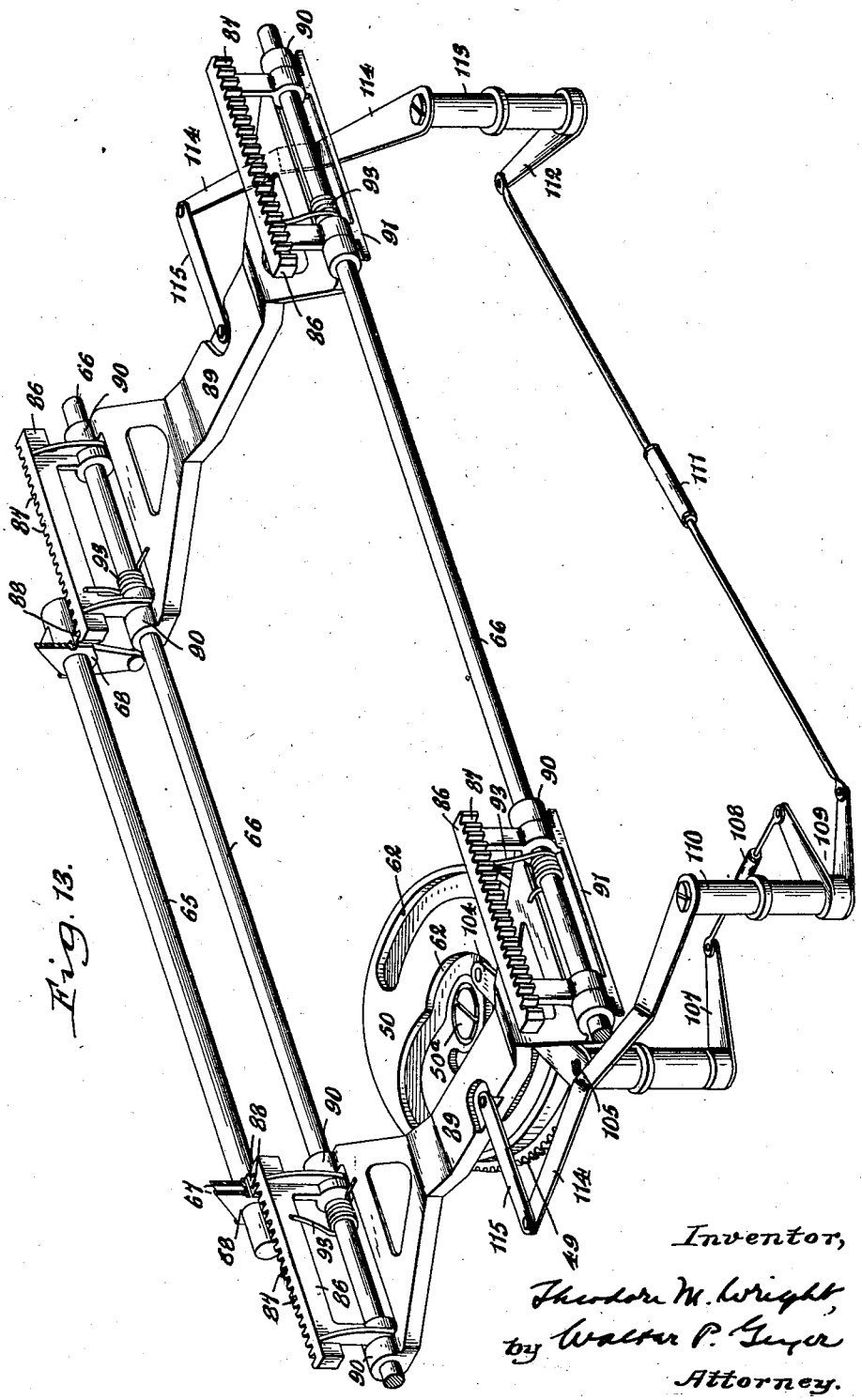

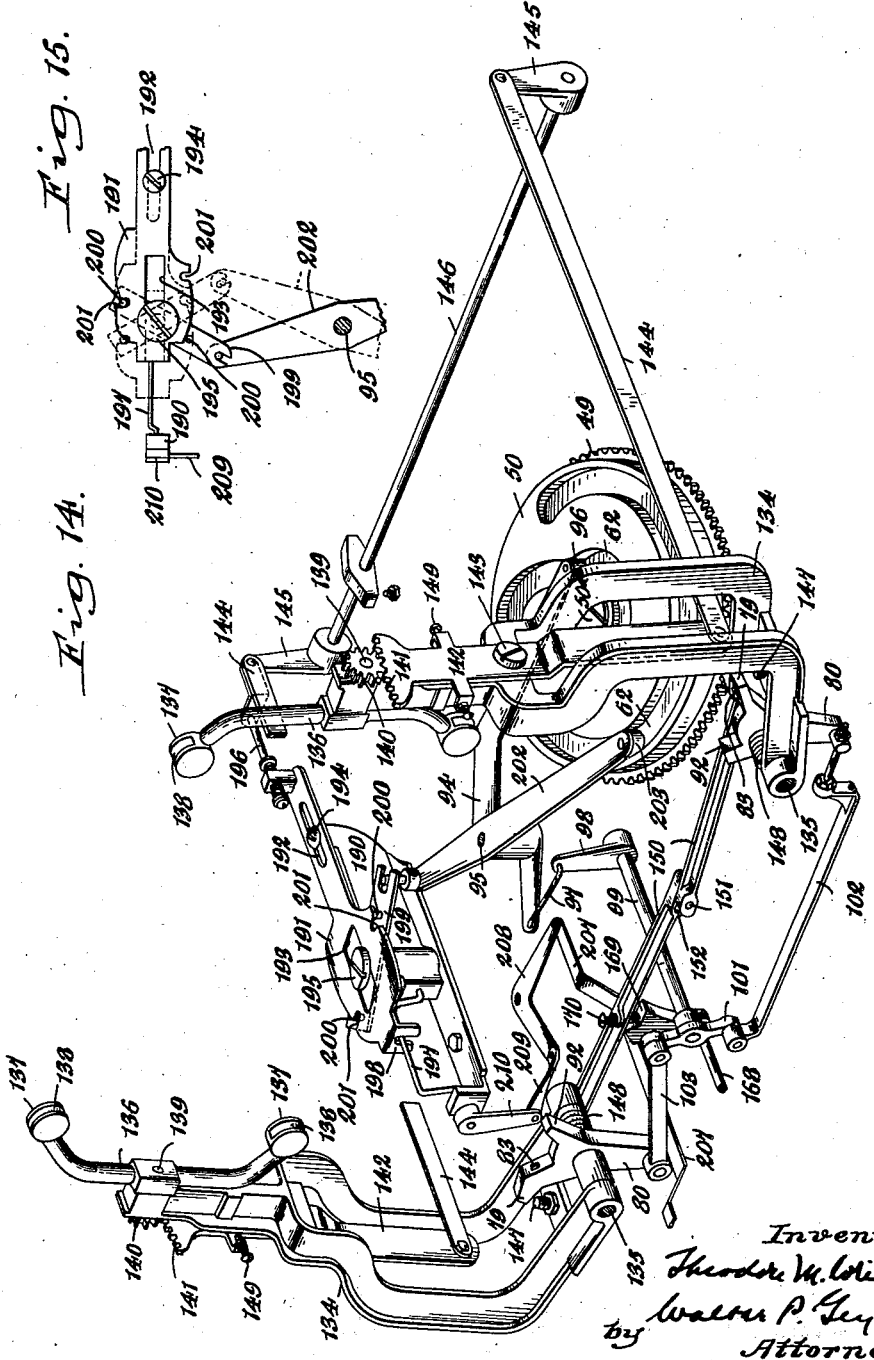

Oct. 13, 1942.  T. M. WRIGHT  2,298,447
AUTOMATIC PHONOGRAPH
Filed Jan. 10, 1939  20 Sheets-Sheet 14
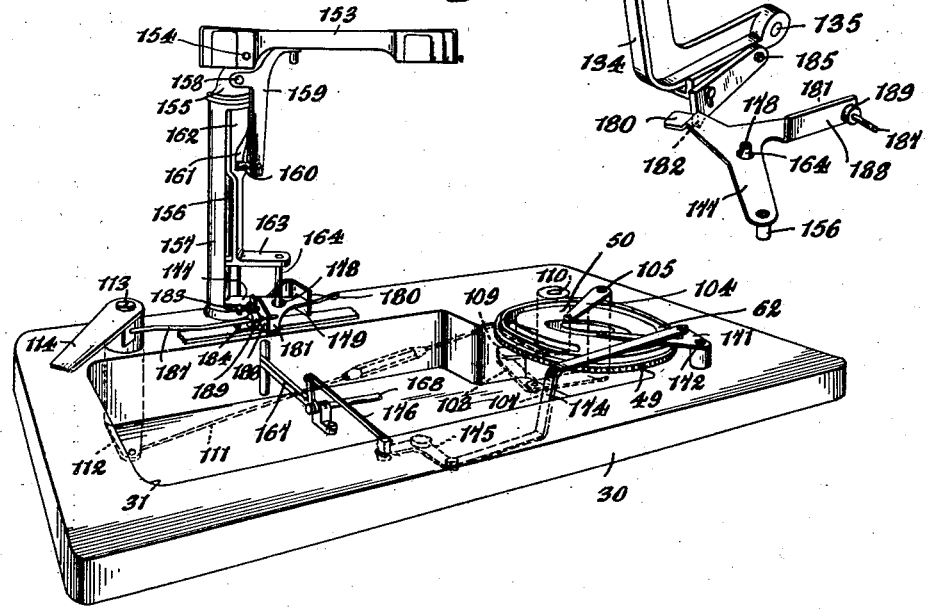
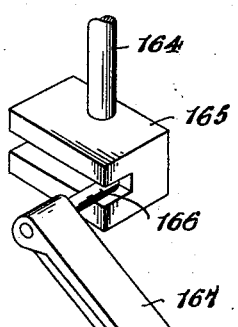
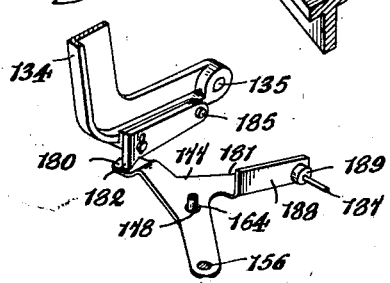
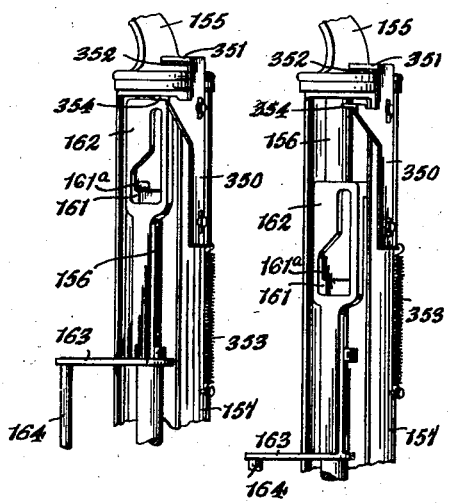

Oct. 13, 1942.　　　T. M. WRIGHT　　　2,298,447
AUTOMATIC PHONOGRAPH
Filed Jan. 10, 1939　　　20 Sheets-Sheet 15

Inventor,
Theodore M. Wright,
by Walter P. Tyger
Attorney.

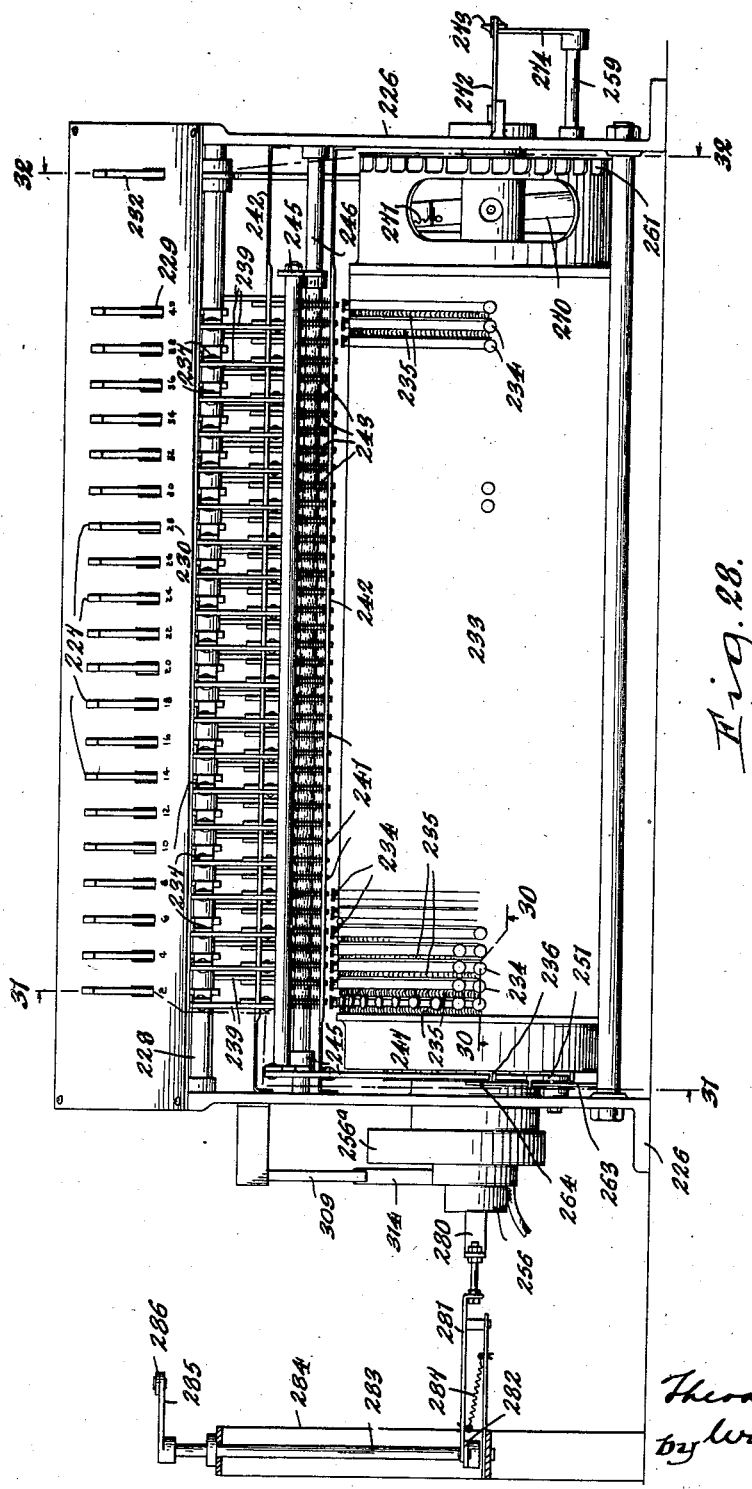

Oct. 13, 1942.   T. M. WRIGHT   2,298,447
AUTOMATIC PHONOGRAPH
Filed Jan. 10, 1939   20 Sheets-Sheet 17
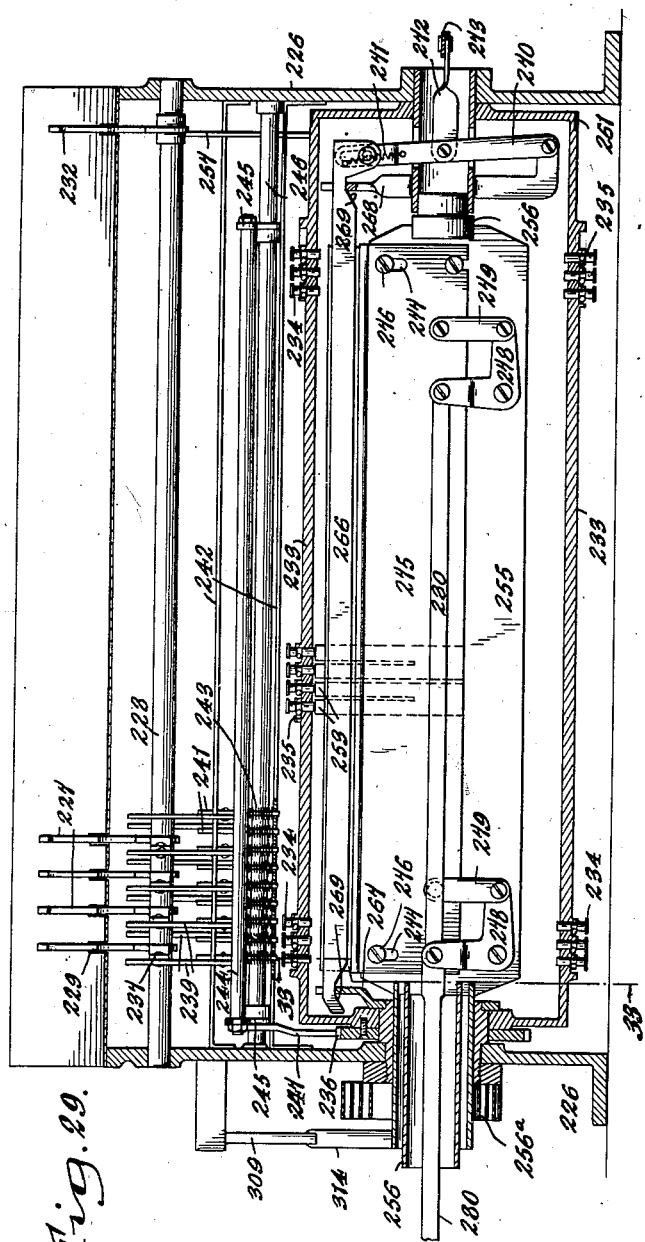
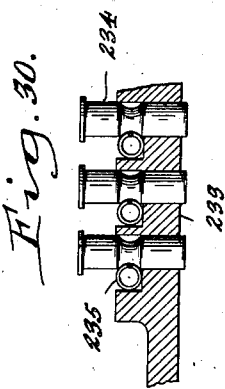
Inventor,
Theodore M. Wright,
by Walter P. Geyer
Attorney.

Oct. 13, 1942.                T. M. WRIGHT                2,298,447
                           AUTOMATIC PHONOGRAPH
                         Filed Jan. 10, 1939      20 Sheets-Sheet 18

Inventor,
Theodore M. Wright,
by Walter P. Guyer
Attorney.

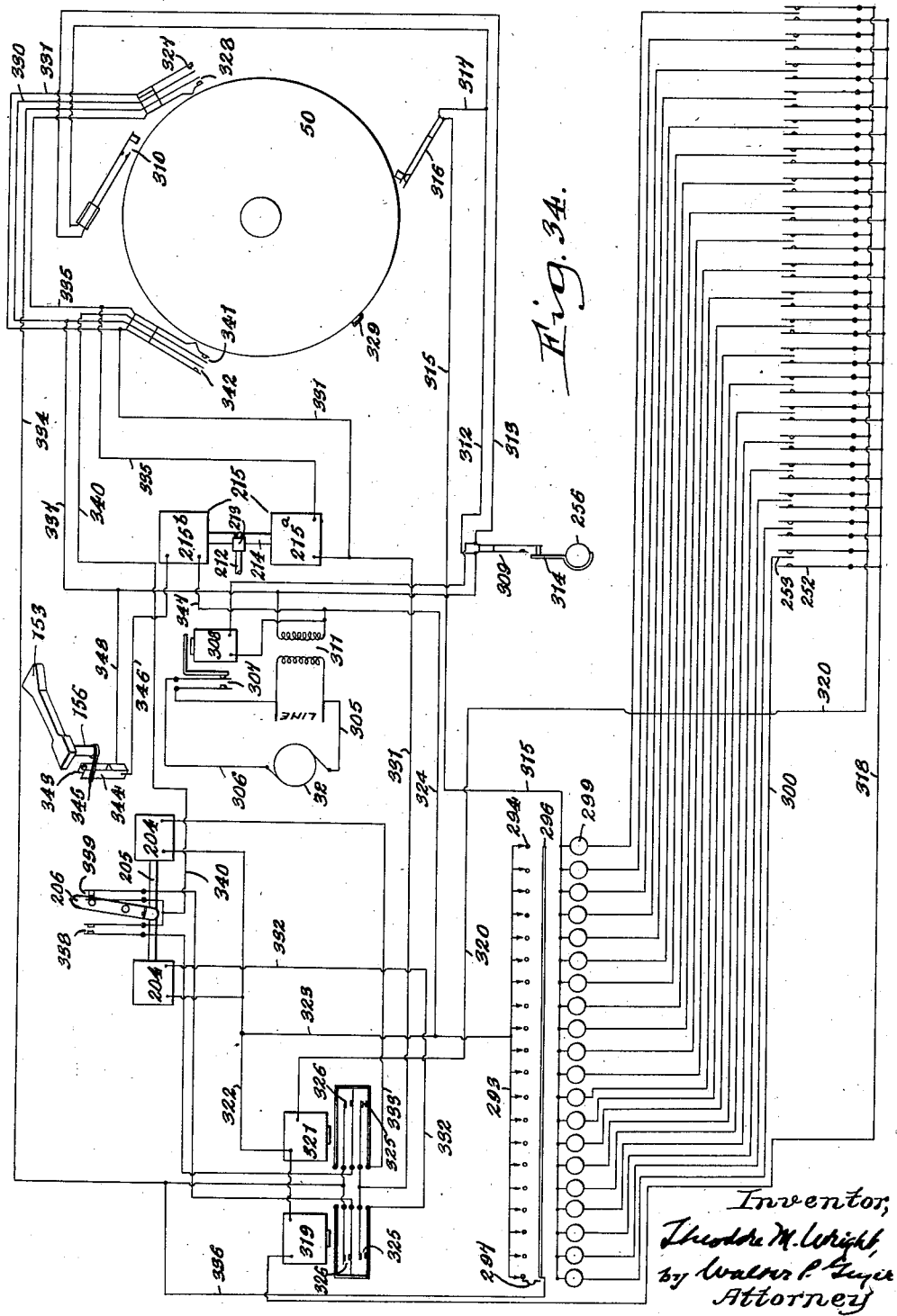

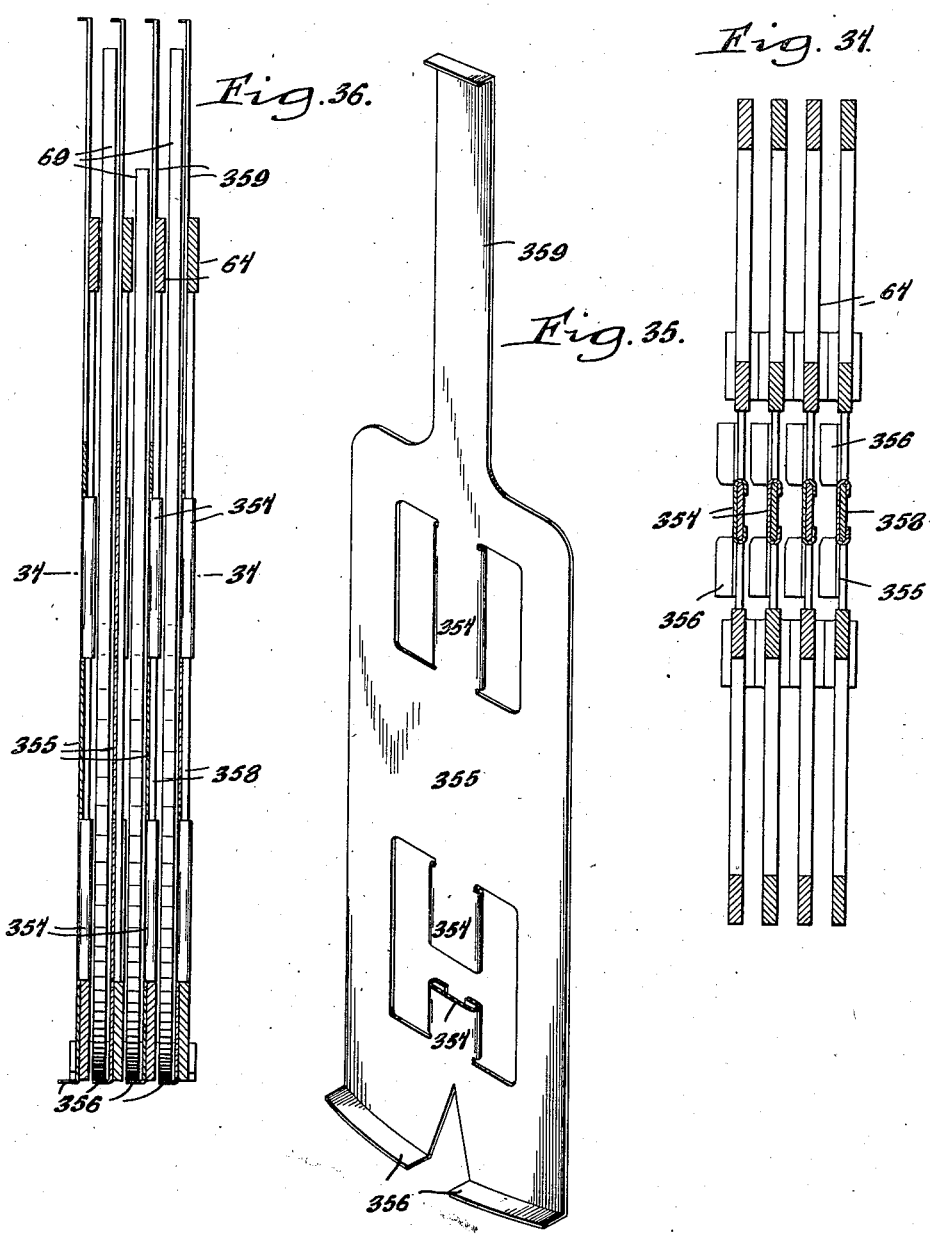

Patented Oct. 13, 1942

2,298,447

UNITED STATES PATENT OFFICE 2,298,447

AUTOMATIC PHONOGRAPH

Theodore M. Wright, North Tonawanda, N. Y., assignor to The Rudolph Wurlitzer Company, North Tonawanda, N. Y., a corporation of Ohio Application January 10, 1939, Serial No. 250,252

75 Claims. (Cl. 274—10)

This invention relates to certain new and useful improvements in automatic selective phonographs.

One of its objects is to provide an automatic phonograph of this character which is universally selective and which is so designed and constructed as to play a plurality of pre-selected records in predetermined sequence or in the order selected, to play either 10" or 12" records irrespective of their relative positions or arrangement in the record-magazine, to selectively play the record on one side or the other in accordance with the side on which the chosen selection is located, and to repeat any record so desired.

Another object of the invention is the provision of a partible or separable record magazine which is adjustably mounted for bodily movement to and from a predetermined selective station, together with means for parting the magazine at opposite sides of the selective station to provide an operating clearance for the playing of the selected record and other means releasably engageable with the selected record for supporting it during the parted condition of the magazine, and for turning such selected record in one direction or the other to present the desired selected side thereof to a playing position.

A further object is to provide reliable and effective means for selectively controlling the movements of the record magazine and the movements of the releasable record-supporting means to and from their selective play positions in predetermined sequence.

A further object of this invention is to provide simple and positive means for controlling the inward swing of the tone arm into proper playing relation with either a 10" or 12" record selected for play.

Another object is to provide an automatic phonograph having swiveled record-gripping means for presenting one side or the other of the record for play, and means for selectively controlling the movements of such record-gripping means in one direction or the other to expose the proper side of the record which has been selected in advance for play.

A still further object is to provide an automatic phonograph having a vertically-adjustable turntable and a horizontally-adjustable record stack with the records disposed in edgewise relation to the turntable and movable across the turntable, when in its lowered position, to a record-selecting position with the record in axial alinement with the turntable, means for splitting the record stack to provide an operating clearance for the playing of the selected record and the elevating movements of the turntable, and means releasably engageable with and for transferring the record to a horizontal position in the elevating path of the turntable for play and for restoring the record to its initial position for presentation to the stack after play.

It is another object of my invention to provide a positive, reliable and efficient electrical selector mechanism for selecting in advance one or more records for play and for automatically controlling the selective positioning of the magazine and the swiveling movements of the record-grippers, such mechanism being so designed as to be multi- and universally-selective and to predetermine the playing of the record-selections in sequence, whether the chosen selections be on one side or the other of a given record, or whether the selections are to be repeated.

Other features of the invention reside in the construction and arrangement of parts hereinafter described and particularly pointed out in the appended claims.

Figure 2:
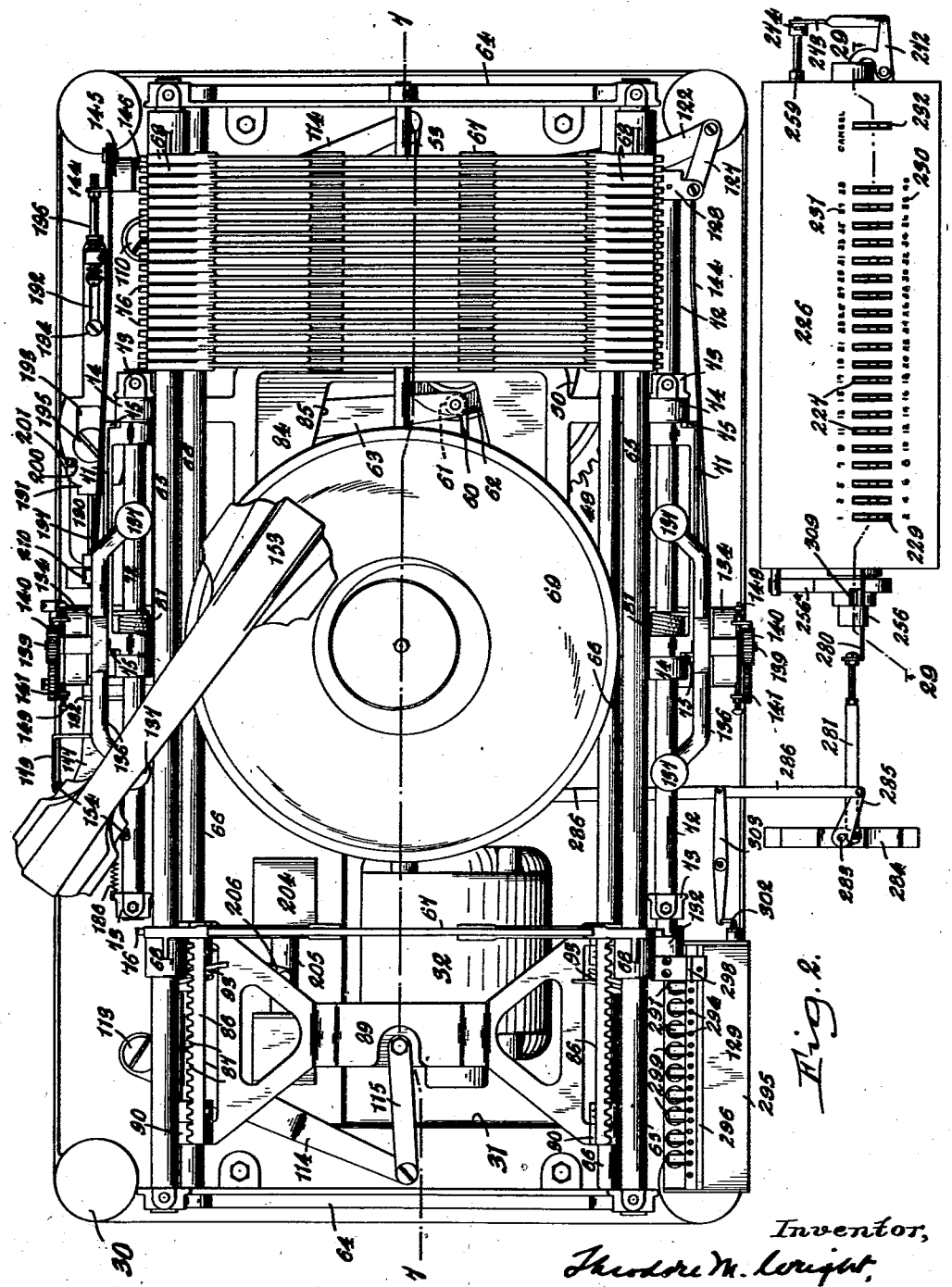
Figure 3:
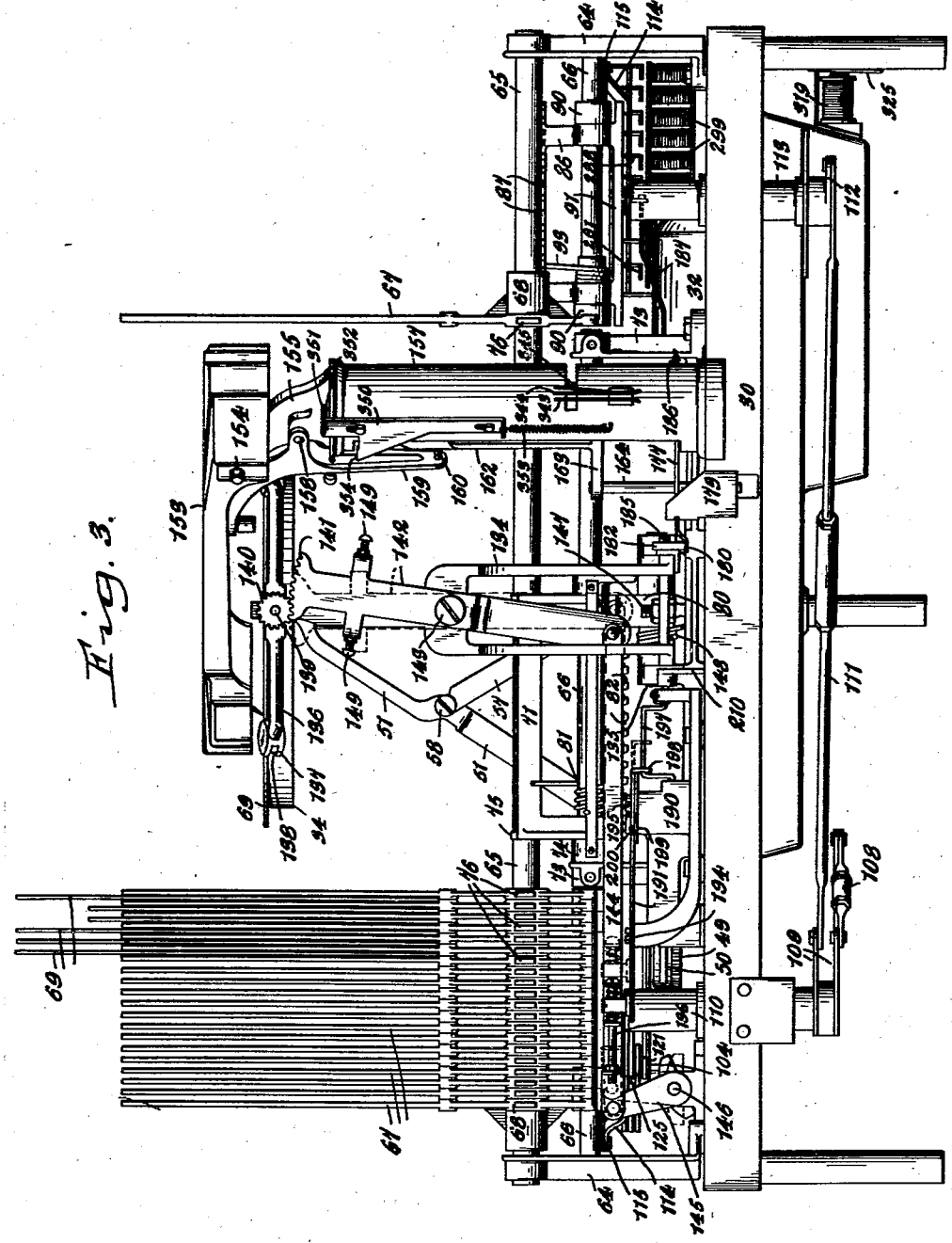
Figure 4:
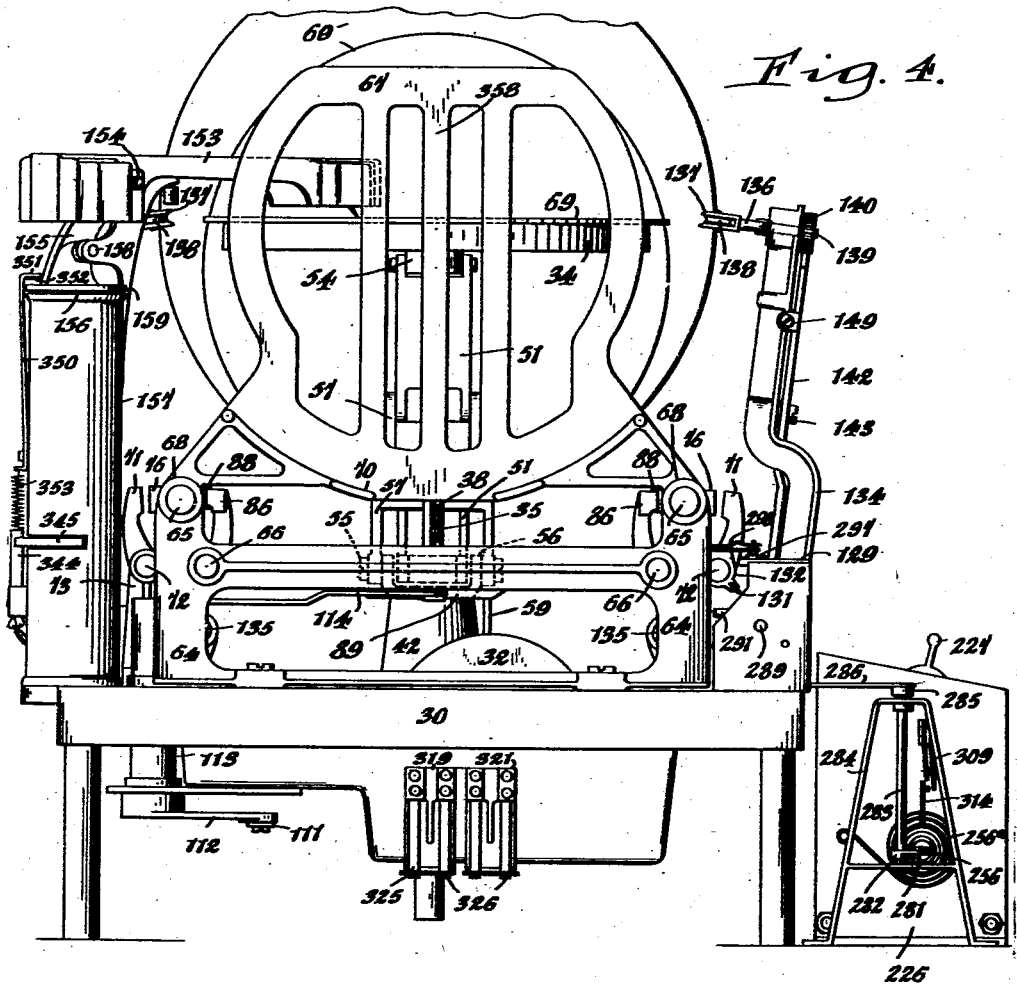
Figure 5:
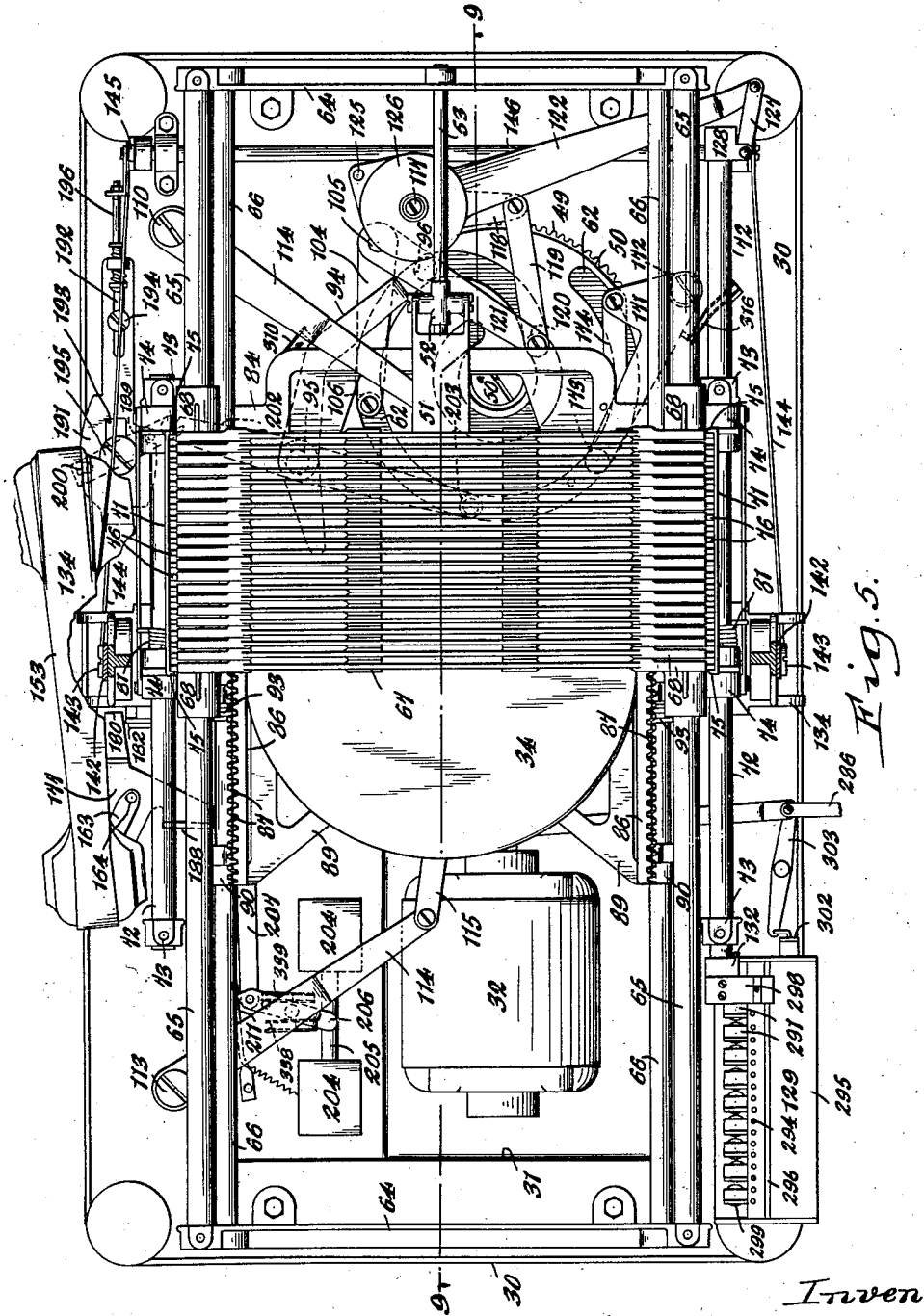
Figure 6:
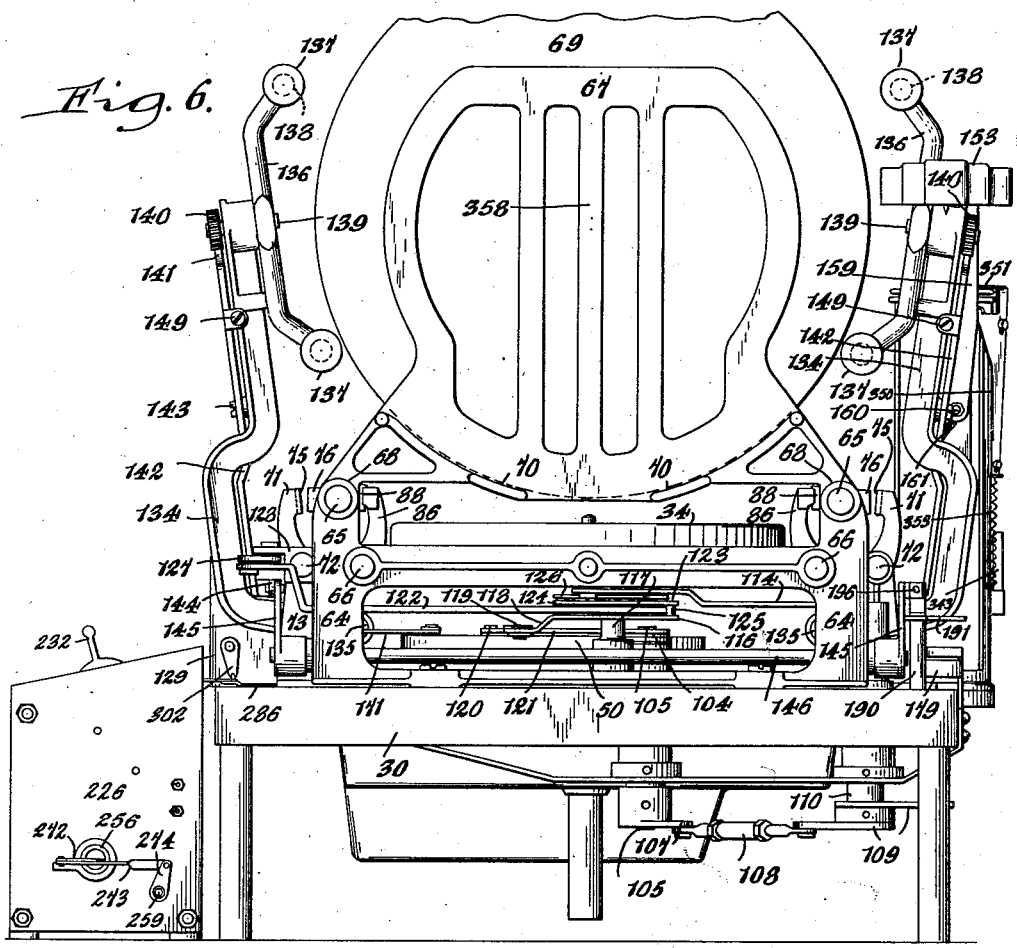
Figure 7:
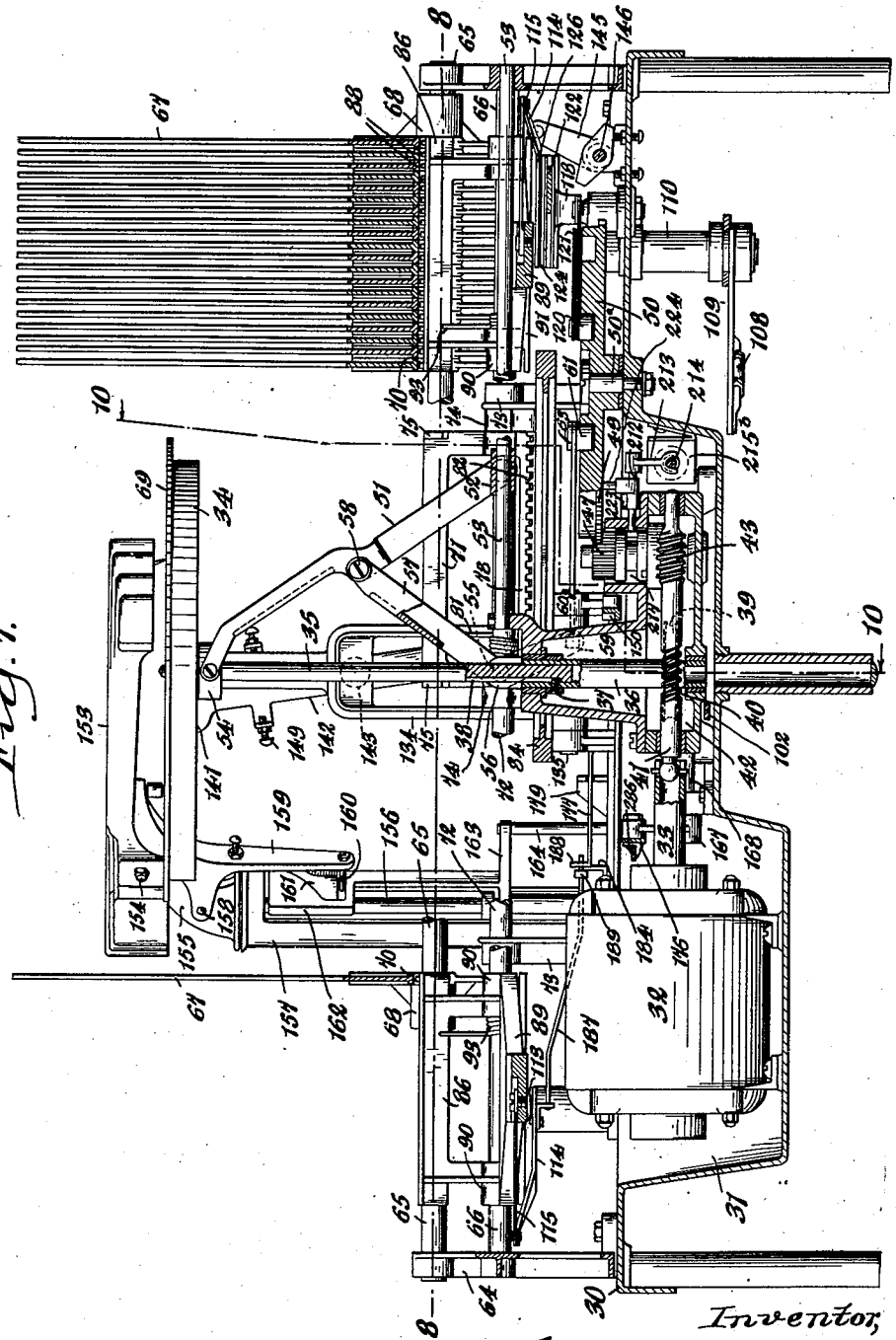
Figure 8:
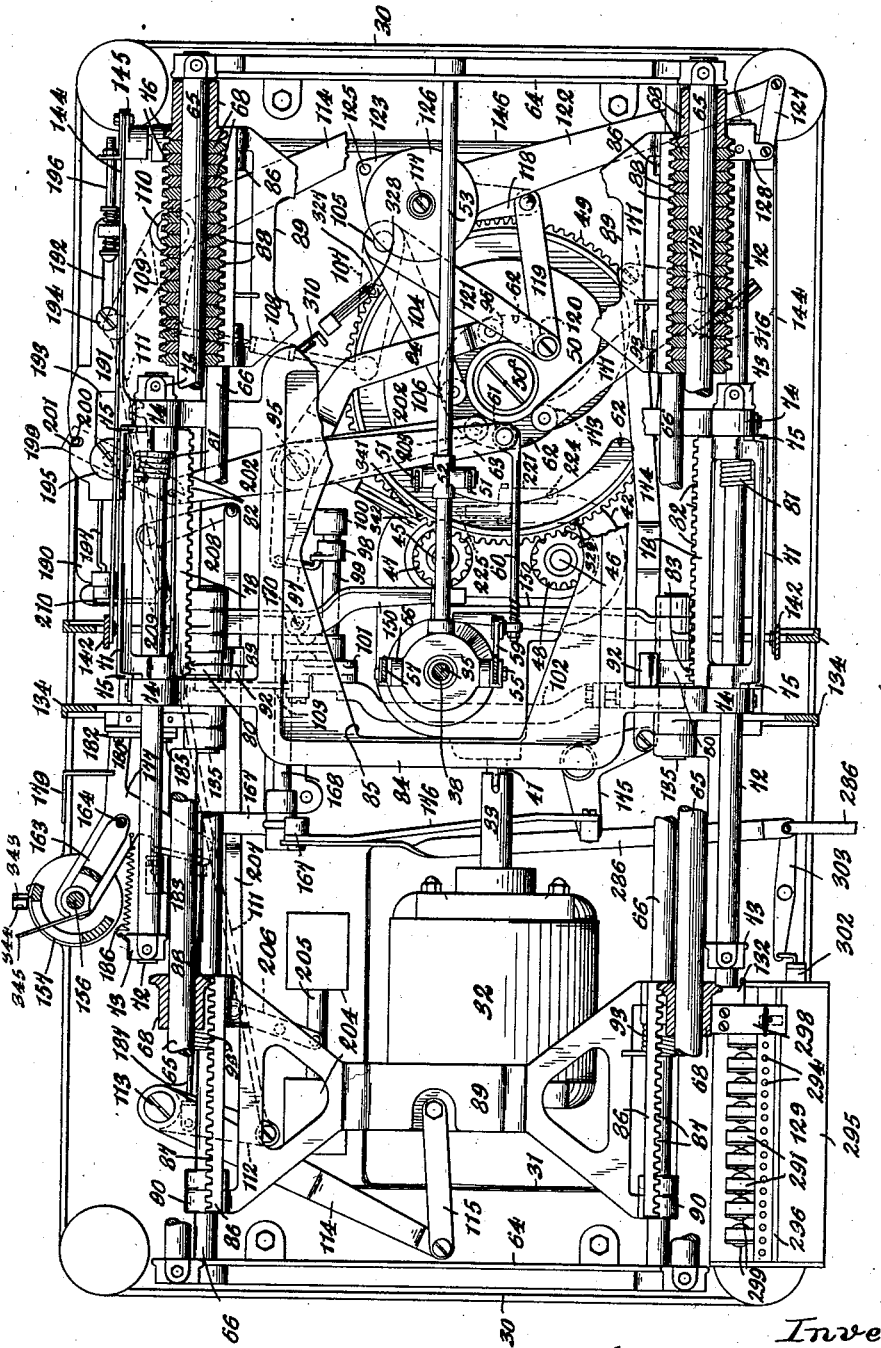
Figure 9:
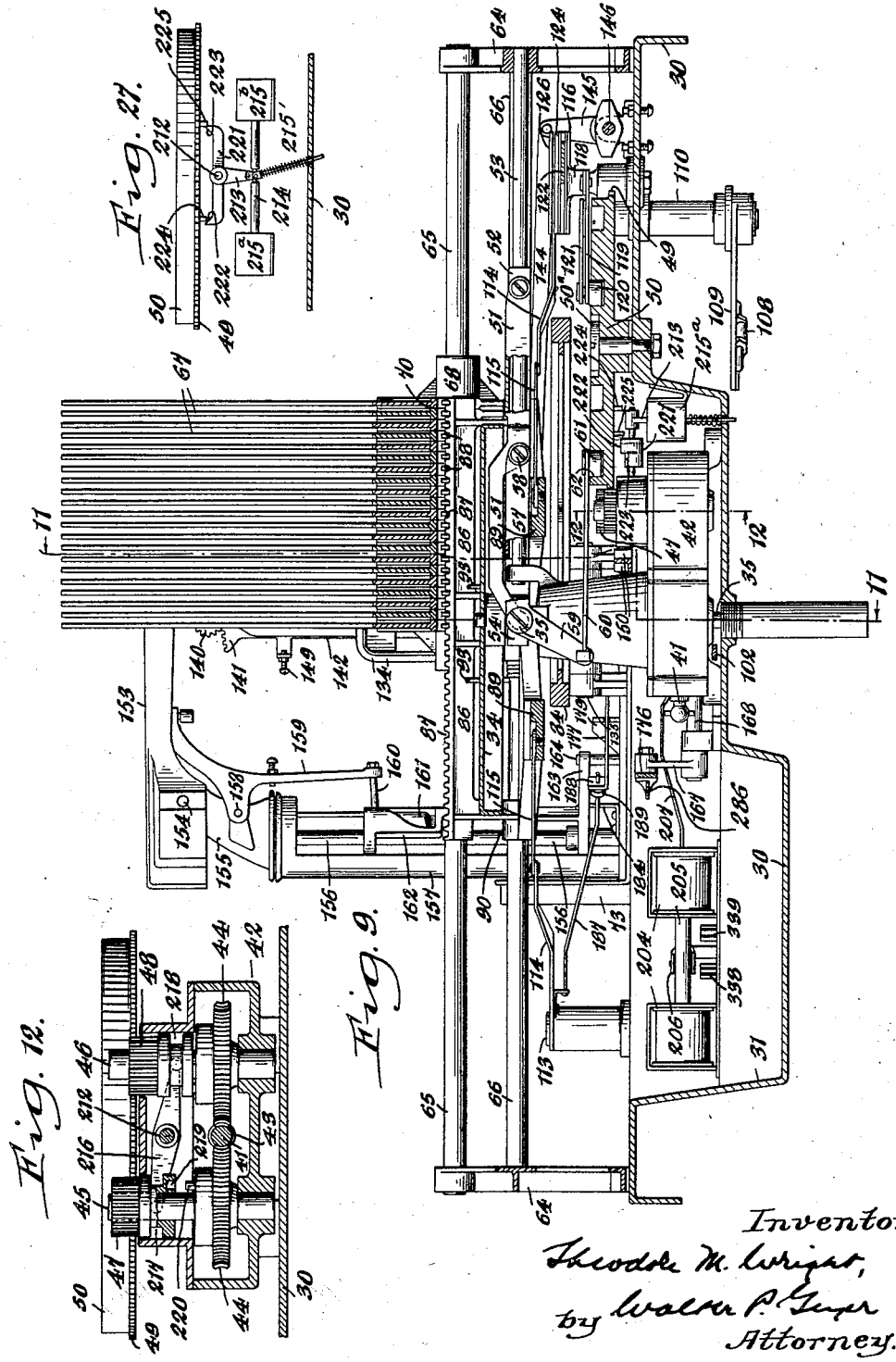
Figure 11:
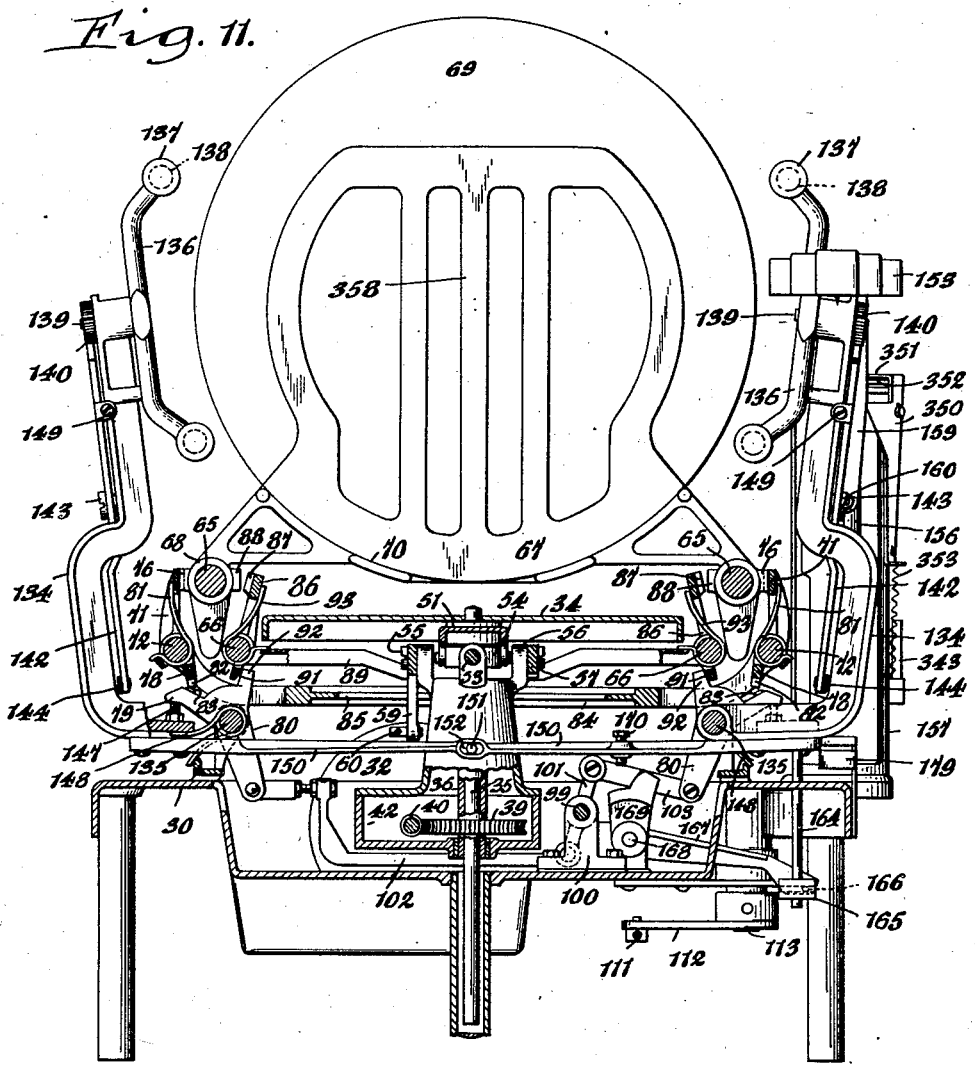
Figure 22:
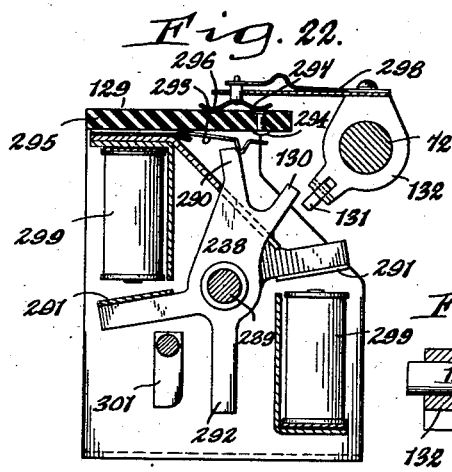
Figure 23:
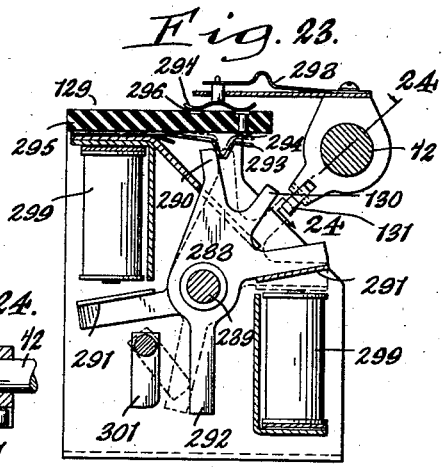
Figure 21:
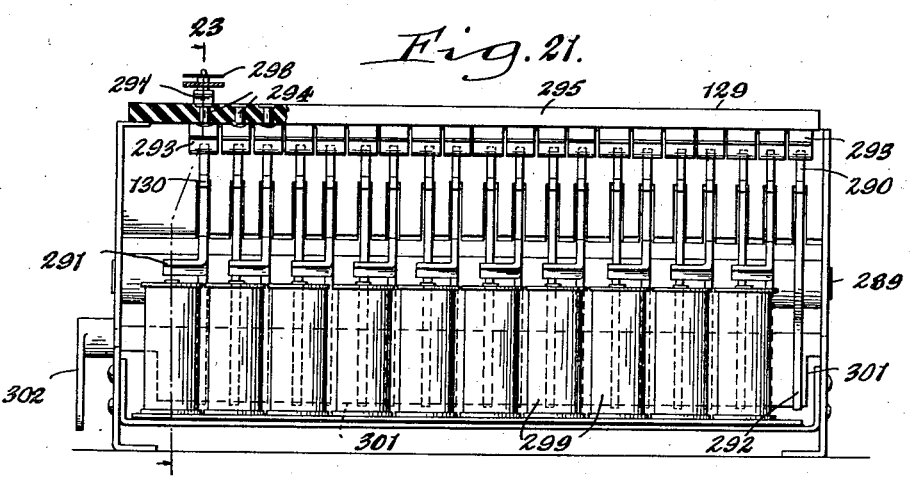
Figure 20:
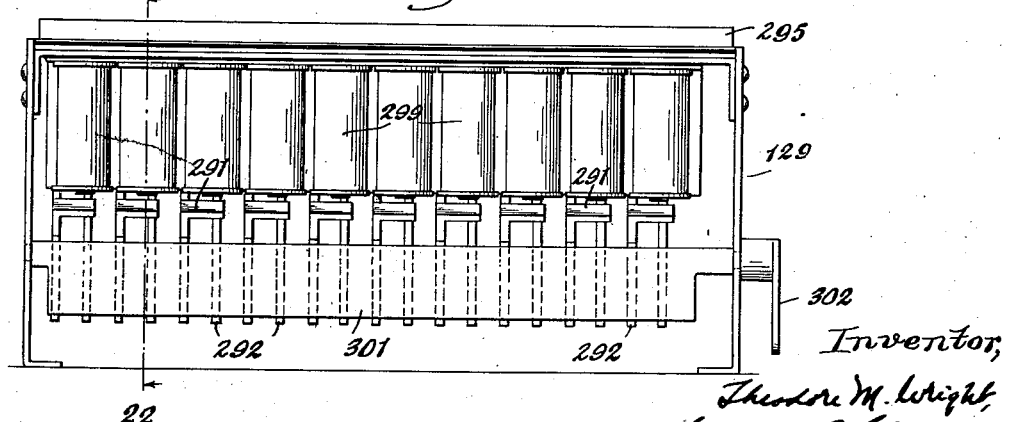
Figure 31:
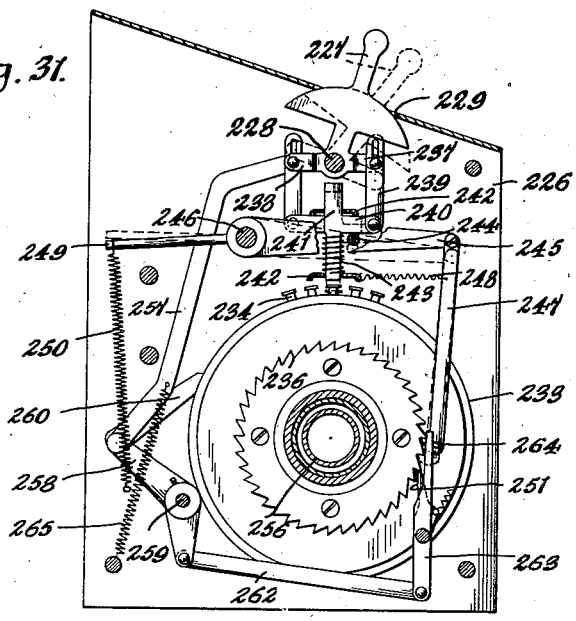
Figure 32:
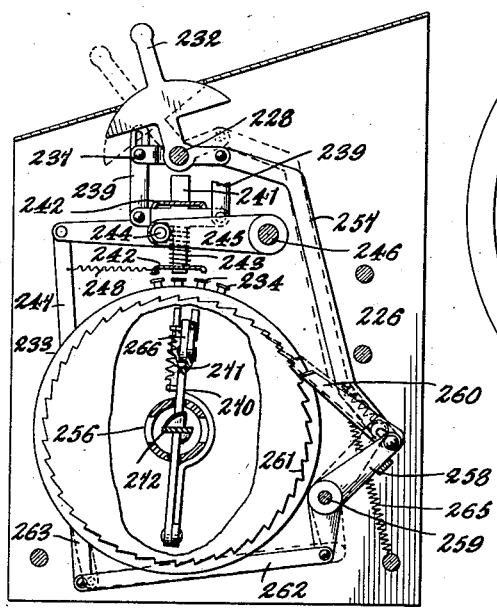
Figure 33:
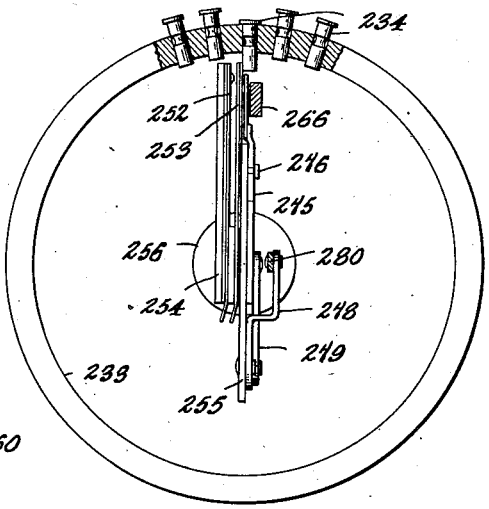

In the accompanying drawings:

Figure 1 is a perspective view of the phonograph embodying my invention, the same being shown in playing position, and with the multi-selective unit detached therefrom. Figure 2 is a top plan view thereof with the parts in like position. Figure 3 is a rear elevation of the same showing the parts in playing position. Figure 4 is an end view of the phonograph viewed from the left hand end of Figure 1. Figure 5 is a top plan view showing the parts in a record-selecting position. Figure 6 is an end view, viewed from the right hand end of Figure 1, and showing the parts in non-play position. Figure 7 is a longitudinal vertical section taken in the plane of line 7—7, Figure 2. Figure 8 is a horizontal section taken substantially in the plane of line 8—8, Figure 7. Figure 9 is a longitudinal vertical section taken substantially in the plane of line 9—9, Figure 5. Figure 10 is a cross section taken substantially in the plane of line 10—10, Figure 7. Figure 11 is a cross section taken substantially in the plane of line 11—11, Figure 9. Figure 12 is an enlarged fragmentary, vertical section taken on line 12—12, Figure 9. Figure 13 is a detailed perspective view showing the coupler bar mechanism for splitting the magazine stack to provide an operative clearance for the playing of a selected record. Figure 14 is a like perspective view showing the gripper mechanism for supporting a selected record and for turning it to and from a playing position to play one side or the other of the record. Figure 15 is a fragmentary top plan view of the mechanism for controlling the swivelling movements of the record-grippers to play one side or the other of a record. Figure 16 is a fragmentary perspective view of that part of the chassis showing the tone arm and related mechanism for governing its movement to and from play position. Figures 17 and 18 are fragmentary elevational views of the tone arm supporting mechanism, showing the same in different positions. Figure 19 is a fragmentary perspective view showing the operative connection for governing the elevating movements of the tone arm to and from play position of the record. Figures 20 and 21 are front and rear views, respectively, the latter being partly in section, of the selective control unit which governs the movement of the magazine to its record-selecting position. Figure 22 is a transverse section taken substantially in the plane of line 22—22, Figure 20. Figure 23 is a like section taken in the plane of line 23—23, Figure 21. Figure 24 is a detail section taken on line 24—24, Figure 23. Figures 25 and 26 are fragmentary perspective views of the mechanism for controlling the playing of 10" and 12" records, respectively. Figure 27 is a detailed end view showing the means for shifting the clutch mechanism associated with the master cam. Figure 28 is a front elevation of the multi-selective unit for controlling the selection of records in advance of playing. Figure 29 is an enlarged longitudinal section of the multi-selective unit taken in the plane of line 29—29, Figure 2. Figure 30 is an enlarged fragmentary longitudinal section taken on line 30—30, Figure 28. Figure 31 is a transverse vertical section taken in the plane of line 31—31, Figure 28. Figure 32 is a transverse vertical section taken substantially in the plane of line 32—32, Figure 28. Figure 33 is a transverse vertical section taken substantially in the plane of line 33—33, Figure 29. Figure 34 is a diagrammatic view of the electrical connections for controlling the phonograph. Figure 35 is a perspective view of a means which may be used for charging and removing records to and from the magazine. Figure 36 is a fragmentary vertical section through the magazine showing the record-charging plates in position therein. Figure 37 is a cross section taken on line 37—37, Figure 36.

Similar characters of reference indicate corresponding parts throughout the several views.

The working parts of the phonograph are mounted on a suitable chassis-frame or bed-plate 30 adapted to be arranged within a suitable cabinet (not shown). Disposed within a well or depression 31 adjacent one end of this frame is a motor 32 whose shaft 33 is disposed horizontally and longitudinally of such frame and serves to not only impart a continuous rotation to the turntable but also as the drive means for operating the various mechanisms for bringing a desired record into and out of play position. The turntable 34 is disposed substantially centrally of the chassis for vertical displacement to and from a predetermined playing elevation and is applied to the upper end of an upright spindle 35 which is guided for movement axially of and drivingly connected to a rotatably driven sleeve 36 through the medium of a key and keyway 37, 38, respectively, the lower end of the sleeve having a worm-wheel 39 fixed thereto and in constant mesh with a worm 40 applied to an extension 41 of the motor-shaft 33. The spindle-driving sleeve 36 and the motor-shaft extension 41 are journaled in a suitable housing or gear-box 42, the free end of such extension having a worm 43 thereon meshing at its opposite sides with diametrically opposed worm wheels 44 loosely mounted and free to revolve on the lower ends of companion upright posts 45, 46 suitably secured to the housing in spaced relation transversely of the frame 30 as shown in Figure 12. These worm wheels function to drive in opposite directions one or the other of companion clutch-controlled pinions 47, 48 loosely mounted for axial adjustment on the upper ends of the corresponding posts 45, 46, respectively, and which pinions engage a ring gear 49 formed on a master cam 50 rotatably mounted on an upright stud 50ª rising from the chassis frame, as shown in Figure 5, and controlling the mechanisms for selectively bringing a desired record into play position and after play restore such mechanisms to their initial or starting position, all in a manner which will hereinafter appear. It might be stated here, however, that the pinion 47, when clutched to its companion worm wheel 44, rotates the master cam 50 in a counter-clockwise direction (viewing the front side of the machine) to bring a record into play, while the other pinion 48, when clutched to its companion worm wheel, rotates the master cam in a clockwise direction to restore the played record to its initial position in the magazine.

The raising and lowering movements of the turntable 34 are preferably effected from a lever and linkage connection initiated from the master cam 50, this connection including a vertically-swinging lever 51 pivoted at its lower end to a longitudinally-slidable head 52 guided on a horizontal rod 53 suitably supported at its ends in the chassis-frame and pivotally jointed at its upper end to a bearing collar 54 applied to the corresponding end of the turntable-spindle 35. Pivotally connected at 55 to lugs 56 rising from the top of the gear-box 42 and in line with the axial plane of the spindle is a vertically-swinging rock lever 57 whose upper end is pivotally jointed at 58 to the lever 51 at a point intermediate the ends thereof, while its lower arm 59 is connected to a horizontally-shiftable actuating link 60 having a roller 61 at its free end engaging a circumferential groove, indicated generally by the numeral 62, in the top side of the master cam, such groove being of a contour to in one instance impart a thrust to the link 60 in a direction to cause an unfolding of the levers 51 and 57 to elevate the turntable to play position and in another instance to impart a thrust to said link in the opposite direction to cause a folding of such levers to lower the turntable to its initial position. If desired, a horizontally-swinging rock arm 63 may be connected at its free end to the axis of the cam-engaging roller 61 to properly guide the latter during the cam movements.

The record magazine or carriage is so designed and constructed as to move as a unit or stack in a horizontal plane over the turntable in its lowered position and with the records supported edgewise in a vertical position, or normally at right angles to the turntable, whereby to selectively position the magazine to present or locate a given record in a vertical plane over and substantially in line with the turntable-axis; the magazine is adapted to be split or separated in such a fashion that those portions or sections thereof to the right and left of the selected record are bodily shifted in opposite directions to provide an operating clearance for turning the record from its vertical or storage position to a horizontal playing position and also to allow for the raising and lowering movements of the turntable. To this end, this record magazine is preferably constructed as follows:

Rising from opposite ends of and extending transversely of the frame 30 are brackets 64 in which are supported pairs of upper and lower longitudinal guide rods or tracks 65, 66 disposed at opposite sides of the turntable. Guided on the upper pair of rods 65 for bodily movement as a unit or group to a predetermined record-selecting position over and relative to the turntable as well as for movement in split or divided groups at diametrically opposite sides of the turntable to provide for playing clearance, are a plurality of upright panels or separators 67 whose lower portions are provided with bearing hubs 68 engaging said bars. The records 69 are supported between the opposing faces of adjoining sparators, a pair of the latter jointly constituting a record-holder or pocket which is open at its top and sides, and each separator is shouldered adjacent its lower end and on opposite faces thereof to provide substantially arcuate record-supporting seats 70. These separators are preferably so shaped that either the standard 10" or 12" size records will protrude partly beyond the side edges of the separators, whereby to expose their marginal edges for gripping purposes as will hereinafter appear. The records may be readily introduced into or withdrawn from the separator-forming pockets by a sliding action, the seats 70 properly centering the records lengthwise of the magazine. The phonograph shown in the drawings is designed to receive twenty records and this capacity requires twenty-one separators 67 to provide twenty record-receiving pockets.

For the purpose of effecting a bodily movement of the separator-composed magazine lengthwise of their guide bars 65 to a predetermined selective station or position of adjustment with a given record in the axial plane of the turntable, there is provided a selective coupler mechanism adapted to releasably interlock with and bind or clamp the several separators 67 in their nested or fully collapsed position shown in Figures 8 and 10. This coupler mechanism is so designed as to shift laterally into and out of coupling engagement with opposite sides of the magazine-stack to grip the several separators as a clamped unit and thereafter to be shifted longitudinally to locate a given or selected record in a vertical plane intersecting the turntable-axis, after which the coupler mechanism is released to permit the splitting of the magazine-stack at opposite sides of the selected record. By preference, this coupler mechanism consists of pivotal clamping yokes or jaws 71 disposed at opposite sides of the magazine and pivoted on longitudinal rods 72 to rock laterally toward and from each other. These rods are disposed below and parallel to the guide bars 65 and one of them, say the front one, is supported for sliding movement in brackets 73 rising from the chassis-frame 30, while the companion one may be supported in like brackets at the rear of the chassis. The front clamping yoke moves with its supporting rod, while the rear clamping yoke slides on its supporting rod. The clamping yokes are held transversely in alinement by stop collars 74 and each is substantially of inverted U-shape in plan and terminates at its opposite ends in inwardly-directed flanges 75 for gripping the several separators between them, the longitudinal spacing between these flanges being substantially equal to the width of the contracted magazine-stack as determined by the number of separators employed. Each of the separators 67 is provided at its opposite side edges and substantially radially of its bearing hubs 68 with outwardly-facing lugs or projections 76 and the clamping yoke-flanges 75 are adapted to embrace the companion lugs of the endmost separators in the inwardly-rocked position to clamp the separators as a unit in the manner shown in Figures 18 and 11. It will be understood that the several separators are identical in construction so as to be universal during assembly and those lugs 76 on the separators intermediate the endmost ones serve as facial abutments to retain the separators in their normal pocket-forming relationship.

Extending downwardly from and coextensive with each clamping jaw 71 is a bar-like extension or tappet 78 with which a trip finger 79 of a companion vertically-swinging substantially Y-shaped rock member 80 is engageable at a predetermined time for laterally swinging the companion jaw outwardly and retaining it in its released position, while a spring 81 serves to urge the jaw to swing inwardly to its clamped position at a predetermined time as the rock member is swung in a receding direction from contact with the bar-like extension of the jaw. This bar-like extension has a longitudinal row of notches 82 in its lower edge and the finger 79 of the rock member has a tooth 83 on its inner face engageable with one or another of such notches in the released position of the clamping jaw, as shown in Figure 6, to lock the latter against endwise displacement and to retain it in pre-set position in readiness to effect the clamping of the magazine-stack when called upon to do so, as when the selected record has been played and the split stack-sections again brought together in registering relation with the companion clamping jaws.

The shiftable clamping jaws 71 are movable in unison and are preferably tied together for that purpose by a tie-plate 84 which extends transversely between said rods beneath the path of travel of the record magazine and whose attaching or suspended ends may terminate in the clamping jaw stop collars 74. This tie-plate has an opening 85 therein to provide the necessary clearance during its fore and aft selective-adjusting movements relative to the turntable-spindle and gear-box 42 and related parts.

Guided for longitudinal movement on the lower pair of guide rods 66 for releasable coupling engagement with the opposite side edges of one or more of the respective magazine-separators 67 to effect the horizontal splitting of the magazine-stack at either side of the turntable and thereby provide the necessary operating clearance for bringing a selected record into position for play, as well as to restore the split sections to their contracted fully-stacked position, are a pair of simultaneously operable coupler mechanisms, one operating to shift one of the split sections of the stack back and forth to the left of the turntable axis, and the other section in like fashion to the right of such axis. Each of these coupler mechanisms is the same, resembling in some respects the structural and operating characteristics of the coupler or clamping mechanism for effecting the bodily movement of the magazine to a record-selecting position, and a description of one of them will suffice for both. Pivotally mounted on each of the rods 66 for a combined longitudinally-sliding and vertically-swinging movement is a coupler member or bar 86 having a row of longitudinal notches 87 in its outer upper side for releasable coupling engagement with companion lugs 88 projecting inwardly from the hubs 68 of the magazine-separators and disposed in opposed relation to the lugs 76 with which the clamping jaws 71 cooperate. A tie-plate 89 extends transversely between the guide rods 66 and terminates at its ends in spaced attaching collars 90 which slidingly engage said rods and also serve as stops for holding the coupler bars against relative axial displacement on their respective rods and maintain their opposing notches in proper transverse registering relation, at the same time assuring sliding movement of the companion coupler bars in unison. Extending downwardly from the pivoted end of each coupler bar 86 and coextensive therewith is a tappet element 91 with which a trip finger 92 extending radially from the Y-shaped rock member 80 is engageable at a predetermined time for laterally swinging the companion coupler bar inwardly to a released position with its notches unlatched from the separator-lugs 88. A spring 93 serves to constantly urge each coupler bar 86 to swing outwardly into latched or coupled engagement with registering separators 67. It will be observed from Figures 6 and 11, that when the Y-shaped member is rocked in one direction its trip finger 92 abuts the tappet element 91 and rocks the companion coupler bar 86 inwardly to a released position relative to the magazine-separators, and substantially at the same time or preferably prior to such release, the companion trip finger 79 is moved to a receding position relative to the clamping jaw extension 78 to allow the spring 81 to urge the clamping jaw 71 to swing inwardly into bodily-clamped engagement with the magazine-separators. Reversely, when the Y-shaped member 80 is rocked in the opposite direction, its trip finger 92 recedes from the tappet element 91 and permits the spring 93 to urge the coupler bar 86 into latched engagement with the separators and immediately following such latching action, its trip finger 79 abuts the clamping jaw-extension 78 and swings the jaw to and retains it in released position. From the foregoing it will be understood that during a bodily selective adjustment of the magazine, the clamping jaws 71 are in gripping or coupled engagement with the several separators 67 while the stack-separating coupler bars 86 are released therefrom, and during the horizontal separating and contracting movements of the split sections of the stack the coupler bars are interlocked with the magazine-separators while the clamping jaws are released therefrom.

The vertical rocking movements of the companion rock members 80 for governing the coupled and released positions of the clamping jaws 71 and coupler bars 86 are controlled from the master cam 50 through the medium of a horizontally swinging lever 94 fulcrumed intermediate its ends on a vertical pivot-stud 95 and having a roller 96 on one arm thereof engaging the cam-groove 62, while the other arm is connected by a link 97 with a lever 98 fixed on one end of a horizontal rock shaft 99 journaled in bearing brackets 100 mounted on the chassis-frame adjacent the rear side thereof. Fixed on the other end of this shaft is a two-armed lever 101, the lower arm being pivotally joined by a forwardly-facing link 102 with the lower end of the rock member 80 at the front side of the machine, while the upper arm of said lever is pivotally joined by a rearwardly-facing link 103 with the rock member at the rear side of the machine. By this construction, when the lever 94 is swung in one direction by the cam 50, the rock members are simultaneously swung in a direction, say to couple the clamping jaws 71 with the magazine-separators 67, while when such lever is swung in the opposite direction the jaws are released from the separators.

The companion pairs of coupler bars 86 for splitting and contracting the record stack are disposed at opposite sides of the turntable-spindle 35 for reciprocal movement toward and from each other in a definite predetermined path, viz., from the spindle-axis to points adjacent the opposite ends of the chassis-frame 30. In their inward or stack-contracted positions, the coupler bars of one pair abut at their inner ends against the opposing inner ends of the companion coupler bars of the other pair, the line of abutment being transversely in the plane of the turntable-axis, so that during a selective record adjustment, the respective pairs of coupler bars will be interlocked with those companion magazine-separators 67 which happen to be located at opposite sides of the turntable-spindle and the stack will thence be split or separated at that point. The means for reciprocating these pairs of coupler bars 86 for this purpose are likewise initiated from the master cam 50 at a predetermined time in the selecting cycle of operations and include a horizontally swinging lever 104 fixed to the upper end of an upright rock shaft 105 suitably journaled in the chassis-frame and having a roller 106 thereon engaging the cam-groove 62. Fixed to the lower end of the shaft is a lever 107 connected by a link 108 to one arm of a bell crank 109 fixed on the lower end of an upright shaft 110 disposed at the rear and adjacent one end of the chassis, the other arm of the bell crank being pivotally joined to one end of a longitudinally-extending link 111 whose other end is connected to a lever 112 fixed on the lower end of an upright shaft 113, the latter being companion to the shaft 110 and located adjacent the opposite end of the machine. Secured to the upper end of each shaft 110, 113 is a rock lever 114 connected by a link 115 to the corresponding tie-plate 89 associated with the companion pair of coupler bars 86.

The means for actuating the selective coupler mechanism, including the separator clamping jaws 71 and the front shiftable rod 72 in longitudinally-reciprocating paths are also initiated from the master cam 50 at a predetermined time in the selecting cycle of operations and comprise a clutching or slippage unit including an oscillating driving disk 116 loosely mounted on an upright stud 117 and having a radial arm 118 thereon joined to a thrust link 119 having a roller 120 at its free end engaging the cam-groove 62. Joined to the free end of this thrust link is a pivoted guide arm 121. Pivoted on the stud 117 over the driving disk is a magazine-actuating member preferably consisting of a horizontally-swinging rock lever 122 and interposed between the lower hub-face of the latter and the disk 116, and between the upper hub-face of said lever and a superposed disk 123 are friction disks 124 which normally function to effect a driving couple between the disk 116 and the lever 122 but which permit a slippage between these parts should the lever be held against movement, as when the selective coupler mechanism is arrested at a given position of adjustment. The upper disk 123 is connected to the driving disk 116 by a coupling pin 125 and suitable spring elements may be interposed between the top side of said disk 123 and a clamping plate 126 to provide the proper clutching action between the driving disk and the lever 122. The free end of the rock lever is connected by a link 127 with an attaching head 128 fixed on the right hand end of the front shiftable rod 72, so that when a thrust is imparted to the cam-engaging link 119 in one direction or the other that rod 72 is shifted in a corresponding direction to bodily shift the clamping yokes 71 and the record-magazine.

The arresting of the front selective-governing rod 72 during the longitudinal bodily movement of the record magazine to a predetermined selective position for playing a given record is controlled by a selector unit indicated generally by the numeral 129 which may be electrically or otherwise controlled and which consists of a longitudinal row of stop elements 130 selectively projectable into the path of a stop dog 131 pivoted to a collar 132 secured to the left hand end of the front rod 72. A spring 133 normally projects the dog into operative position and permits the dog to swing to a receding position over a projected stop element on the return stroke of the magazine-stack. When the magazine is arrested at a given position companion to the record selected for play, any surplus movement transmitted by the cam 50 to the magazine-actuating lever 122 is absorbed in the slippage provided by the disks 116 and 123, permitting an oscillating movement of such driving disks independently of the lever 122.

After a given or desired record selected by the patron has been brought to its proper station transversely alined with the axis of the turntable 34, and in which position the record is upright, means are provided for gripping the record at its diametrically opposite edges and swinging it bodily to a horizontal axial position over the turntable, after which the latter is elevated to a predetermined elevation, viz., that assumed by the gripping means, and the reproducer then swung inwardly and dropped onto the record for playing it. The record-gripping means are disposed at the front and rear sides of the machine substantially in line with the turntable-spindle for inward-gripping and outward-releasing movement, and each preferably consists of a vertically-swinging arm 134 pivoted at its lower end on a horizontal shaft 135 and provided at its upper end with a swiveling record-engaging bail or gripper member 136 terminating at its ends in notched-heads or seats 137 and rollers 138 which are adapted to engage the marginal edge of a record and thereby effectually grip and support it during oscillating movements to and from a playing position. Each gripper bail is mounted on the inner end of a horizontal trunnion 139 journaled in the upper end of its companion arm 134 and provided at its outer end with a gear 140 meshing with an arcuate gear rack 141 formed at the upper end of a vertically-oscillating lever 142 pivoted intermediate its ends on a transverse pivot 143. The lower end of this lever is connected by a longitudinal link 144 to a companion crank arm 145 secured to the corresponding end of a rock shaft 146 disposed transversely at the right hand side of the chassis frame. In the at rest position of the phonograph, the magazine is collapsed and the gripper bails 136 are in a vertical, retracted or released position with the pinion-engaging lever 142 in an upright position. Depending on what side the record is desired to be played, and in this connection selective means are provided for so selecting in advance of playing as will hereinafter appear, the rock shaft 146 is moved in one direction or the other to accordingly simultaneously rock the levers 142 in a corresponding direction and turn the record from an upright storage position to a horizontal playing position.

In the at rest position of the phonograph shown in Figure 11, the gripper-carrying arms 134 are held in their retracted or outwardly-swung position clear of the record-magazine by the lower edges of the trip-fingers 79 of the companion rock members 80 abutting corresponding adjustable stops or bolts 147 applied to the lower ends of the arms outwardly of their pivots. It will be noted that the rock members 80 are likewise pivoted to the arm-pivot shafts 135. These arms are swung outwardly by those same rock members, after the record-magazine is collapsed, and substantially simultaneously with the movement of said rock members in a direction to release the coupler bars 86 from the magazine-separators 67 and interlock the clamping jaws 71 therewith. Springs 148 encircling the pivot-shafts 135 and bearing against the adjoining lower sides of the respective arms 134 tend constantly to swing them to an inward contracted or gripping position with a record. This inward movement of the gripping-arms takes place simultaneously with the movement of the rock members 80 in a direction resulting in the release of the clamping jaws from the record stack and the interlocking engagement of the coupler bars 86 with the magazine-separators 67. In order to limit the oscillating movements of the bail-actuating lever 142, suitable adjustable stops or screws 149 are mounted at the upper ends of the arms 134 in the edgewise paths of said levers, as shown in Figure 3.

The gripper-carrying arms 134 are also adapted to be moved from and toward each other when a record is positioned and supported on the turntable so as to, respectively, remove the bails 136 from engagement with a record during play and after play to bring the bails into engagement therewith. To this end the companion arms are provided at their lower ends with inwardly-facing lateral extensions 150 which are pivotally joined to each other at their inner ends to provide a toggle-like action, one extension having a pivot-pin 151 thereon engaging a longitudinal slot 152 in the other extension. At a predetermined time just prior to and after playing a record one of the arm-extensions 150 is adapted to be swung upwardly and downwardly to accordingly rock the arms outwardly and inwardly, respectively, and these movements are preferably initiated and controlled during the movements of the tone arm to its playing and non-playing positions.

The tone arm, which may be of any suitable and well known construction, is indicated at 153 and is capable of swinging both vertically and horizontally, being pivoted at 154 to a horizontal pivot borne by a head or bracket 155 secured to the upper end of an upright post 156 suitably supported for oscillating movement in a substantially cylindrical standard 157 rising from the top rear side of the chassis-frame 30. Pivoted intermediate its ends at 158 to this bracket is a vertically-swinging lever 159 whose upper arm constitutes a stop for limiting the downward swing of the tone arm while its lower arm is provided with a radial pin 160 engaging a cam-groove 161 formed in the face of a vertically-reciprocating and horizontally-swinging tone arm actuating member 162 guided on the upright post 156, the cam-groove being shaped as shown in Figures 17 and 18 to elevate the tone arm into and out of playing engagement with a record as well as swing it angularly or horizontally to and from playing engagement with a record. The bottom of the cam groove is depressed below the remaining portion to provide a resulting offset or shoulder 161a, so that when the lever-pin 160 encounters this shoulder on the up stroke of the member 162 the tone arm is lowered onto the record, while on the down-stroke of such member the tone arm is elevated clear of the record. At its lower end this member 162 has a radial arm 163 having a rod 164 depending therefrom, the latter having a horizontally-notched block 165 secured thereto with which a pin 166 on one arm of a vertically-swinging bell crank lever 167 is slidingly connected for raising and lowering such member in response to movements of said lever. This lever is fixed on one end of a shaft 168 journaled horizontally on the chassis-frame and parallel to the shaft 99, while its opposite end has a cam 169 thereon adapted for engagement with an adjustable tappet post or screw 170 applied to the adjoining overlying extension 150 of the companion gripper-carrying arm 134 for swinging such extension and its companion one upwardly to accordingly rock the arms 134 outwardly with their grippers 136 clear of the record on the turntable.

The means for actuating the lever 167 for controlling the movements of the tone arm into and out of playing engagement with the record and for governing the movements of the gripper arms into and out of engagement with a record on the turntable are initiated by the master cam 50 at a predetermined time in the cycle of operations of the machine. These means preferably comprise a horizontally-swinging bell crank 171 pivoted at 172 adjacent the cam and having a roller 173 on one of its arms engaging the cam-groove 62 and having its other arm connected by a link 174 with a companion horizontally swinging bell crank 175 connected by a link 176 with the lever 167.

As previously stated, this phonograph is adapted to play 10" and 12" records which may be disposed promiscuously in the magazine and to this end I provide means for governing the inward swing of the tone arm 153 to predetermined positions relative to records of one size or the other, this inward swing being in part controlled by the inward swing of the gripper-carrying arms 134, which for a 10" record obviously swing inwardly further than for a 12" record and this fact has been considered in controlling the automatic pre-setting of the tone arm in its proper relation to different-sized records. From such pre-setting position, as determined by the size of the record selected for play, the tone arm is subsequently swung inwardly into playing position by the angular displacement effected by the cam 161, such displacement being the same for either sized record. This tone arm-positioning means is operatively connected to the tone arm actuating member 162 to rock it inward more or less into predetermined relation with a 10" or 12" record, and preferably consists of a horizontally swinging lever 177 fulcrumed at the lower end of the standard 157 about the post 156 and tied or connected with said member 162 to swing therewith through the medium of the pendant pin 164 passing through an opening 178 in said lever. The latter is guided for swinging movement in a horizontal plane in a notched plate 179 secured to the rear side of the chassis-frame and this lever 177 terminates at its outer end in arms 180 and 181 engageable with companion adjustable stops or abutments 182 and 183, respectively, for arresting the inward swing of the tone arm for accordingly playing 12" or 10" records. The stop 183 may be in the form of an adjusting screw mounted on a bracket 184 secured to the chassis-frame in the path of movement of the lever arm 181 for limiting its maximum inward swing or that predetermining the setting for playing a 10" record. The companion stop 182 is preferably in the form of a vertically swinging latch pivoted at 185 to the lower end of the adjoining gripper arm 134. When these arms are swung to their maximum inward positions for gripping a 10" record, the latch-stop 182 moves upwardly with the arm on which it is carried and is elevated thereby to a position clear of the lever arm 180, (as shown in Figure 25) permitting the lever 177 to swing to its innermost tone arm setting position with its arm 181 abutting the screw stop 183. During the inward swing of the lever 177, its arm 180 rides under the latch-stop 182. When the arms 134 are swung inward in selecting a 12" record for play, the latch-stop 182 is not elevated above the plane of movement of the lever-arm 180 but is disposed directly in its path (as shown in Figure 26) to thereby arrest the inward swing of the lever 177 and properly pre-set the tone arm in its predetermined position relative to such 12" record.

When the bell crank lever 167 is rocked in one direction by the action of the cam-groove 62 and intervening connections, it raises or lowers the tone arm actuating member 162. A lowering movement imparted to such member 162, at the end of playing a record, causes an outward swing of the tone arm due to the pin 160 of the arm 159 encountering the inclined edge of the cam recess 161. Also, the hump or shoulder 161a in this cam recess causes an elevating movement of the tone arm clear of the record simultaneously with its movement outwardly. An up-stroke imparted to the member 162, when preparing to play a record, produces a reverse action of the cam 161 and causes the tone arm to move inwardly and the hump 161a reversely causes the tone arm to swing down onto the record. It will be understood that the member 162 directly governs a constant swing of the tone arm to and from a playing position with the record, while the lever 177 and stops 182 and 183 gage the predetermined in-movement of the tone arm in proper relation to a given-sized record.

The tone arm positioning lever 177 is constantly urged to swing it and the tone arm inwardly to one or the other of its two setting positions, as determined by the stops 182, 183, by a spring 186. The restoration of this lever to its initial position, to swing the tone arm outwardly clear of the magazine-stack to its at rest position, is preferably effected during that cycle of operations wherein the split sections of the record-stack are brought together to their contracted position as a complete unit. To this end, one of the rock levers 114 associated with the companion stack-splitting coupler bar 86, is employed to initiate such movement, such rock lever having a link 187 connected at one end thereto and slidingly fitted at its opposite end in a flange 188 formed on the adjoining arm 181 of the lever 177, said link having a collar 189 thereon abutting such flange to thereby urge said lever 177 to its initial position during the contracting movements of the record stack to normal position. The spring 186 urges the lever in a direction to maintain its flange 188 in abutting relation with the link-collar 189.

It will be noted in Figures 16, 17 and 18 that the cam groove 161 is of such a width at its lower end that the pin 160 on the bracket 159 is free to travel transversely thereof during the inward swing of the tone arm while playing a record, and that when the playing of such record is completed, such pin is disposed adjacent to one of the side edges of the cam groove in readiness to effect the horizontal outward swing of the tone arm when the lever 177 is actuated by the link 187 during the contraction of the split-sections of the record stack.

The means for actuating the vertical rock levers 142 of the contracting arms 134 for in turn oscillating the record-grippers 136 to swing the records from an upright magazine-engaging position to a horizontal playing position, and vice versa, are initiated from the master cam 50 at a predetermned time in the cycle of operations of the machine to rock the shaft 146 and its levers 145 in cne direction or the other to accordingly shift the rock lever connecting links 144 in a corresponding direction to oscillate the grippers from a vertical to a horizontal position or vice versa. This means is preferably constructed as follows:

Mounted at the rear side of the chassis-frame at one side of the companion gripper-carrying arm 134 is a bracket 190 on which a horizontal, longitudinally-reciprocating slide plate 191 is mounted and which is also capable of a horizontally-swinging movement to one or the other of two selective positions of adjustment. Adjacent its ends, this slide plate is provided with longitudinal slots 192 and 193, the slot 192 being engaged by a pivot screw 194 about which said plate may laterally swing, and the slot 193 being in guiding engagement with a screw 195, and of sufficient width relative to the latter to permit such swinging movement. At its outer end this slide plate is flexibly connected by an adjustable, yieldable tie rod 196 with the adjoining link 144 to couple such parts for simultaneous longitudinal movement in one direction or the other, while the inner end of such plate is slidingly connected to a vertically-swinging crank 197 journaled in the bracket 190 and engaging a notched flange 198 depending from said plate, so that when the crank is rocked in one direction or the other the plate 191 is swung laterally, and when the plate is moved lengthwise, it will do so relatively to the crank. Pivoted intermediate its ends to the screw 195 is a horizontally-swinging arm 199 having diametrically-disposed upright pins 200 at its ends adapted for engagement with companion transverse notches 201 formed in the opposite longitudinal edges of the slide plate 191, whereby, when the latter is swung inwardly by the crank 197, its inner notch is engageable with the companion arm-pin 200, so that when the arm 199 is rocked in one direction or the other it will accordingly transmit longitudinal movement to said plate to correspondingly rock the levers 142 in like directions to oscillate the gripper 136. When the outer arm-pin is engaged with the companion outer plate-notch, the movement transmitted to the rock levers 142 is sufficient to oscillate the grippers 136 from a horizontal to a vertical position or approximately a quarter of a turn, say from the position shown by full lines in Figure 3 to that shown by dotted lines in the same figure. When the inner arm-pin is engaged with the companion inner plate-notch, then the rocking of the arm 199 causes a rocking of the levers 142 through a like displacement at the opposite side of their pivots to effect the oscillation of the grippers in the reverse direction, as for playing the opposite side of the record. When one of the other of the rock arm pins 200 is engaged with its corresponding notch 201 in the slide plate 191, the companion pin abuts against the edge of such plate to hold the parts effectually in coupled relation.

The rocking of the arm 199 is initiated from the master cam 50 through the medium of a horizontally swinging rock lever 202 fulcrumed intermediate its ends on the pivot-stud 95 and having its outer end pivotally joined to said arm while its inner end has a roller 203 thereon engaging the cam groove 62.

The rocking of the crank 197 in one direction or the other to shift the slide plate 191 laterally to bring one or the other of its notches 201 into coupling register with one or the other of the arm-pins 200 and thereby predetermine the playing of the record on one side or the other is preferably electrically controlled from a double-acting solenoid 204 mounted on the chassis-frame at one end and adjacent the rear or tone arm side thereof. The plunger 205 of this solenoid is connected to one end of a horizontally-swinging rock arm 206, while its other end is connected to a longitudinal link 207 pivotally joined to one arm of a horizontally-swinging bell crank 208. The other arm of this bell crank is connected by a tie member 209 with a crank arm 210 fixed on the crank 197. By this construction, when one or the other of the solenoid-coils is energized, the plunger thereof is shifted in one direction or the other to accordingly rock the crank arm 210 in a corresponding direction and thus shift the slide plate laterally for setting it in position to play the side of the record desired. A spring-pressed dog 211 may be provided for operative engagement with the beveled end of the rock arm 206 to retain the parts in a given adjusted position.

The means for governing the shifting of the cam-driving gears 47 and 48 for controlling the counter-clockwise and clockwise movements of the master cam 50, for in turn controlling the mechanisms for selectively bringing a desired record into play position and after play to restore such mechanisms to their initial or starting position, is preferably constructed as follows:

Journaled in the gear box 42 is a horizontal rock shaft 212 having a depending arm or yoke 213 at its outer end operatively connected to the plunger 214 of a double-acting solenoid 215, while at its inner end and extending into the gear box is a double-ended rock arm 216. One end of this rocker arm engages the grooved hub 217 of the gear 47, while the other end of the rocker arm engages a like groove 218 in the hub of the companion gear 48. Each of the gear hubs has a socket 219 therein which is adapted to releasably engage a coupling pin 220 on the companion worm wheel 44, as shown in Figure 12. When the rocker arm 216 is in the position shown in Figure 12, the gear 48 is clutched to the companion worm wheel 44 to thereby drive the master cam 50 in a clockwise direction.

When the solenoid 215 is energized, the shaft 212 is rocked in a direction to reverse the position of the rocker arm 216 to bring the gear 47 in clutching engagement with its companion worm 44 by releasing the gear 48 from its companion gear. Also mounted on the rock shaft 212 is a second rock arm 221 which is disposed beneath the master cam 50 and has cam surfaces 222 and 223 at opposite ends thereof and in laterally-displaced relation or in different circumferential positions relative to the axis of the cam, the latter having pins 224 and 225 thereon which are adapted at predetermined times to encounter the cam-ends of the rocker arm, to displace it in one direction or the other.

Operatively connected with the selector unit 129 for automatically controlling the same to govern the record changing mechanism of the phonograph is a second or electrically-operated selector unit whereby a patron may pre-select in advance or at any time during the playing of the phonograph any recordings desired, whether such recordings be on one side or the other of the records, or whether it would be desired to repeat certain recordings. Furthermore, the electrical selector unit is so designed that the records may be played in any desired sequence, that is, to play, said, record No. 3 on one side, to play record No. 5 on the opposite side, to play record No. 1 on one side twice in succession, etc. In other words, this selector unit is universally multi-selective, it is designed to store up or register the selections as chosen by the user and to be played in the sequence desired.

This selector unit is shown, by way of example, as disposed at the front side of the phonograph chassis and is preferably constructed as follows:

The working parts of this selector unit are arranged in a suitable casing 226 in which are mounted a longitudinal row of suitably spaced selector levers 227, each pivoted for vertically-swinging movement on a common pivot shaft 228 fixed in the upper end of the casing and each movable from a normal neutral position to a forward position for pre-selecting a recording desired which is on one side of the record or to a rearward position for preselecting a recording which is on the other side of the same record. As shown in Figure 31, these levers project through corresponding slots 229 formed in the top wall of the casing and the end walls of these slots limit the movements of the levers to their respective selecting positions. These levers may be identified in any suitable manner to indicate the record recordings borne by the phonograph, and as shown in Figure 2, rows of numbers or like designations 230 and 231 may be provided which are arranged in rows along the front and rear edges of the slots 229, the even numbers indicating the recordings on one side of the records and the odd numbers indicating the recordings on the opposite sides of the records. At one end of the casing a cancelling lever 232 is provided for enabling the user to cancel any individual selection previously made.

Journaled lengthwise in the casing below the selector levers is a rotatable seelctor drum 233 having a plurality of rows of annular switch-controlling buttons 234, there being two rows of such buttons for each selector lever 227 and the latter being in transverse vertical alinement between companion push buttons. One row of push buttons controls the playing of one side of the record, while the companion row controls the playing of the opposite side of the record. These buttons are supported radially in the peripheral wall of the drum for movement in a radial direction to and from a selective switch-closing position and annular coil springs 235 may be seated in the drum adjoining the annular row of buttons to frictionally hold the buttons in one position or the other. The phonograph shown in the drawings is equipped with twenty records which make a repertoire of forty selections, and in this connection, twenty selecting levers 229 are provided movable to one or the other of two selective positions to play one side or the other of a record and included in each annular row of switch-controlled buttons 234 are forty of such buttons so that irrespective of the angular or radial position of the drum at any given time, there is a companion push button for operative action by a given selector lever. Fixed to one end of this drum is a ratchet wheel 236 having as many teeth as there are switch-controlled buttons 234 in a given annular row, this ratchet wheel serving to successively advance the drum a distance of one tooth for each selective movement of the selector levers. The means for so controlling the movement of the drum from the selector levers is constructed as follows:

At its lower end each selector lever 227 terminates in a cross bar including opposing, laterally-offset arms 237 and 238, respectively, which cooperate with adjoining rows of switch-controlling buttons 234, one arm acting on one or another of a registered button in a given annular row for controlling the playing of one side of the record and the companion arm acting on one on another of a registered button in the adjoining annular row for controlling the playing of the other side of the same record. Each selector lever arm is pivotally connected by a pendant, slotted link 239 to a lateral extension 240 of a button-actuating plunger 241 guided for vertical movement in upper and lower guide plates 242 secured at their ends to the casing 226, there being one of these plungers for each annular row of buttons. A spring 243 applied to each plunger normally urges it to an elevated non-selecting position. When the selected plunger is depressed, it projects the alining switch-controlling button 234 to the position of the middle button shown in Figure 33. Disposed beneath and common to the several plunger-extensions 240, is a pawl-actuating rod 244 attached at its ends to vertically-swinging arms 245 fulcrumed on a longitudinal shaft 246 supported at its end on the end walls of the casing 226, that arm adjoining the end of the selector drum 233 on which the ratchet wheel 236 is mounted having a depending drum-actuating feed pawl 247 pivoted thereon at its free end and normally held in engagement with the ratchet wheel by a spring 248. Projecting from the other end of the pawl-carrying arm is an extension 249 to which a spring 250 is connected for constantly urging the lever to rock in a direction to advance the drum counter-clockwise, viewing Figure 31, a distance of one tooth. A keeper pawl 251 normally engages the ratchet 236 to prevent its movement in a clockwise direction, viewing Figure 31, during the downward movement of the pawl 247 over the face of a ratchet tooth, so that the drum will be held against relative movement during that time. By this construction, when a selector lever 227 is manually moved in one direction or the other to a selected position, one or the other of the links 238 or 239 is displaced downwardly to in turn depress its companion plunger 241 and alined, vertically-positioned switch-controlling button 234 inwardly of the drum, and at the same time cause the plunger-extension 240 to engage the pawl-actuating rod 244, rocking the latter downwardly about its fulcrum 246 against the resistance of the spring 250 to advance the pawl 247 idly downwardly relatively to the engaging tooth of the ratchet wheel a distance of one tooth. When the user completes the selecting stroke and releases his grip on the selecting lever, the spring 250 then acts to move the pawl 247 upwardly and advance the ratchet wheel and its selector drum a distance of one tooth, and during this movement the selector lever and intermediate connections are restored to their initial positions, the depressed switch-controlling button 235, however, remaining in its selective governing position until restored by other means to be hereinafter described. With each movement of one or more of the selector levers to selecting positions, the companion switch-controlling buttons are depressed and the drum successively advanced a distance of one tooth for each selection made to properly position the buttons for effecting the sequential selection of the records desired.

Arranged within the selector drum 233 is a rotatable switch assembly adapted to be turned therewith during its advancing, selecting movements by a clutching of the depressed buttons 234 therewith, and having a plurality of companion, switch elements 252, 253 which are radially mounted between suitable frame pieces or plates 254 and 255, respectively, extending lengthwise of the drum and having sleeve-like journals 256 at their opposite ends which are rotatably mounted in the end walls of the casing 226, whereby the selector drum may be rotated independently of the switch assembly, and the latter in turn may be rotated jointly with the drum at predetermined times. The switch elements 252, 253, the latter one of which is movable relatively to the former to close and open the switch, are disposed side by side lengthwise within the selector drum and in the same common plane, there being one pair of switch-elements for each annular row of push buttons 234, with adjoining or companion pairs associated with each selector lever being electrically connected in common or as one, as shown in Figure 29, so that any depressed push button in a given row, governing the playing of a recording on one side or the other of a given record, is adapted at a predetermined time and in the sequence order of selection to engage and close the alined switch to establish a circuit for selectively governing the movement of the record magazine to its selective station of adjustment corresponding to that of the record selected. These several switches are normally in an open position and are only selectively and individually closed when a companion depressed push button so closes it, the closing of the switch in each case taking place by the depressed button contacting and moving the movable switch element 253 in contact with its companion element during the rotation of the selector drum 233 a distance of one tooth of its ratchet 236, as imparted to it by the upstroke of the feed pawl 247 in the manner previously described. Simultaneously with this switch-closing movement, the switch assembly is turned as a unit in a like direction, each leading push button always being in position to so advance the switch assembly for each tooth-distance advance of the selector drum. A coil spring 256ª connected to one of the journals 256 of the switch assembly tends to yieldingly resist such advancing movements, and as each leading push button of a group selected is restored to its initial position, this spring urges the switch assembly in the opposite direction against the next depressed push button and so on, thereby resulting in the sequence playing of the records selected.

Means are also provided for manually cancelling a recording, previously selected, but not yet positioned for play, and for automatically cancelling the selection after its record has been operatively positioned for play, the cancelling operation in either case being that of restoring the campanion selected push button 234 to its initial non-select position. The manual cancellation of a previously selected record is effected by the cancelling lever 232 which is pivotally mounted on the same shaft 228 to which the selecting levers 227 are pivoted, and pivotally connected to this cancelling lever is a pendant link 257 whose lower end is joined to one arm of a bell crank lever 258 fixed on a shaft 259 suitably supported in the casing 226. Also joined to the same arm of this bell crank is a pawl 260 which is engageable with an annular row of ratchet teeth 261 applied to the right hand end of the selector drum 233 and which, when the cancelling lever is moved to cancelling position shown by dotted lines in Figure 32, is adapted to turn the drum in a direction opposite to that imparted by the selector levers 227 and their companion feed pawls 247, to thereby restore the drum to the same position in which it was previous to a position effected by a given selecting operation. In other words, a selected push button 234 is thereby moved in a direction away from a companion pair of switch elements 252, 253, so as to open the switch and cancel the selection. Connected to the other arm of the bell crank 258 is a link 262 which is operatively connected to a rock arm 263 arranged to engage a pin 264 projecting from the lower end of the feed pawl 247 so that during a reversed rotation of the drum by the cancelling pawl 260 the feed pawl 247 is automatically released from operative engagement with its ratchet wheel 236 so as not to interfere with the reversed cancelling movement of the drum in response to a movement of the cancelling lever 232 to a cancelling position. When the user releases his grip on the cancelling lever 232, a spring 265 restores it and its associated parts to their initial position.

Simultaneously with the movement of the selector drum to a cancelling position in the manner just described, a means is provided for restoring the companion depressed selected button 234 to its initial non-selecting position. For this purpose a button-cancelling bar 266 is disposed lengthwise within the drum 233 in cooperative relation with the inner ends of the upper central row of selector buttons, such bar being mounted for radial displacement into engagement with an alining depressed push button to restore it to its initial non-selection position. This bar is supported at its ends on notched arms 267 and 268 for longitudinal displacement relative thereto and said bar has inclined cam faces 269 adjacent its ends and at the lower edges thereof, so that upon an endwise shifting of the cancelling bar 266 in one direction or the other it is accordingly displaced relatively to the arm-notches and radially outwardly or inwardly to and from a button-cancelling position. The longitudinal displacement of the selector bar is effected by a vertically-swinging rock lever 270 pivoted at its lower end to the companion end of the adjoining notchedarm 268 and connected at its upper end by a slotted joint to the adjoining end of such bar, so that when said lever 270 is rocked in one direction or the other the selector bar is accordingly displaced outwardly or inwardly. A spring 271 normally urges the bar to its inward position. Connected to the bar-shifting lever 270 is a horizontally-swinging bell crank 272 which is connected by a link 273 with a crank arm 274 applied to the adjoining end of the shaft 259 on which the bell crank 258 is fixed. By this construction, when the cancelling lever 232 is moved to a cancelling position to accordingly rotate the drum in a direction opposite to that effected during selection, motion is transmitted to the shaft 259 and thence to the rock lever 270 to shift the cancelling bar longitudinally and effect its radial outward displacement by the coaction of its cam faces 269 with the notched ends of its supporting arms 267 and 268. The outward displacement of the cancelling bar engages any selector buttons 234 in its path and restores them to their non-selecting positions.

The automatic cancelling or restoration of a given selector button 234, after it has performed its record-selecting function, is controlled during the movement of the tone arm into playing engagement with the selected record, and is preferably initiated from the movement imparted to the bell crank lever 167 by the master cam 50. Mounted on the switch-carrying plate 255 is a vertically-displaceable cancelling plate 275 joined thereto by screw and slot connections 276, 277 and engageable at its upper edge when displaced radially outwardly with an alined depressed push button 234. The vertical displacement of this cancelling plate is effected by a pair of bell crank levers 278 fulcrumed on the lower end of the switch-carrying plate 255, one arm thereof being connected by tie links 279 with the cancelling plate and the other arm of each of said levers being connected by a link 280 disposed substantially axially of the selector drum 233 and including a swivelly-joined adjustable extension 281, the latter being arranged exteriorly of the selector drum and connected with a crank arm 282 fixed on the lower end of an upright shaft 283 supported in a suitable bracket 284. At its upper end this shaft 283 has a crank arm 285 connected by a link 286 with the bell crank lever 167. A spring 287 connected to the extension 281 of the link 280 serves constantly to urge the latter in a direction to retain the cancelling plate 275 in an inoperative position. However, when the bell crank 167 is actuated for swinging the tone arm inwardly to a play position, motion is simultaneously transmitted to the link 280 through the intermediate connections just described to in turn rock the levers 278 in a direction to shift the cancelling plate 275 outwardly and restore the alined push button 234 to its initial non-selective position.

During the angular displacement of the switch assembly, due to the selection of a plurality of records in advance, the cancelling plate 275 moves bodily therewith and the axially-swivelled connection between the link 280 and its extension 281 permits such displacement without affecting the position of the extension 281 and the parts associated therewith. The manually-controlled cancelling bar 266, however, always assumes a position vertically below the selecting levers 277 being retained in that position by its notched supporting arms 267 and 268, and the connection of the rock lever 270 to the adjoining lever 272 is disposed substantially axially of the selector drum.

The means for automatically controlling the selector unit 129 and its selective-controlling stop elements 130 to govern the sequence playing of the recordings selected in advance by the selector levers 227 is preferably constructed as follows:

Disposed in a longitudinal row in the selector assembly 129 are a plurality of individual, vertically-swinging, electrically-governed rocker arms 288 to which the selectively-projectable stop elements 130 are applied and which correspond in number to the records and the selector levers 227, each being governed by a companion selector lever. These rocker arms are fulcrumed on a common horizontal pivot-shaft 289 and each includes, in addition to its stop element 130 for arresting the magazine at the corresponding record-selecting station, a switch-controlling finger 290, an armature element 291 and a cancel-governing finger 292. The finger 290 of each rocker arm controls the closing and opening of a switch 293, 294, the movable element 290 thereof being in the form of a yieldable blade and the fixed element being in the form of a contact post toward and from which the movable element is actuated to close or open a circuit in response to the selecting and cancelling movements imparted to the rocker arm in one direction or the other. These contact-posts 294 are attached to an insulating panel 295 and are adapted to be selectively bridged across a common longitudinal conductor strip 296, seated in said panel alongside such posts, by a bridge bar 297 fixed to the collar 132 of the magazine-governing rod 72. A spring 298 acts on this bridge bar for urging it in contact with the parts 294 and 296.

Disposed in operative relation to the armature element 291 of each rocker arm 288 is an electro-magnet 299, their being ten of such magnets disposed in a longitudinal row in the upper position and at one side of the selector unit 129 for cooperation with certain of said rocker arms, while the remaining ten magnets are disposed in parallel relation to the first row but at the lower and opposite side of the selector unit for cooperation with alternately-arranged rocker arms, whereby, when one or another of the magnets is energized, its companion armature 291 is attracted and the corresponding rocker arm is moved in a clockwise direction, viewing Figures 22 and 23, to present its stop element 130 into the path of travel of the stop dog 131 and arrest the magazine at the selected station. Each electro-magnet 299 is connected by a wire 300 to adjoining pairs in common of the companion selector-lever-controlled switch 252, 253, so that when a selector lever 227 is moved to a position to select one side or the other of the companion record, the corresponding magnet will be energized by one or the other of the affected pair of push buttons 234 to project the corresponding stop lug 130 into position for arresting the magazine at such station where the record selected will be in axial transverse alinement with the turntable.

The cancel-governing finger 292 of each selectively-set rocker arm 288 is adapted, at a predetermined time after the completion of a selective operation, to be tripped by a vertically-swinging tappet bar 301 disposed alongside and common to the several rocker-fingers 292 so as to restore such rocker arm to its initial or non-selective position. This tappet bar has a crank arm 302 at one end thereof which is connected to one end of a horizontally-swinging lever 303, the other end of the latter being connected to the link 286 which joins the bell crank 167 with the crank arm 285 and which operates the cancelling plate 275 in a direction to cancel a given push button 234. By this construction, the movement of the tone arm to play position not only cancels the selected button but at the same time effects the restoration of the companion rocker arm 288 to its initial position, the tappet bar being rocked in a direction to turn such rocker arm to that position.

The electrical circuit for automatically controlling the operation of the phonograph upon the selection of one or more recordings is shown in Figure 34 and is constructed and arranged as follows:

The motor 32 which drives the various movable parts of the phonograph is connected by wires 305 and 306 to a source of power and includes a normally-open main switch 307 adapted to be closed by a relay 308 which is in turn rendered operative or energized to close the main switch by one or the other of two switches 309 or 310 included in the circuit of such relay. This relay circuit derives its power from a transformer 311 and includes the wires 312, 313 to which the switches 309, 310 are connected in parallel. The switch 309 is controlled from the electrical selector unit mounted in the casing 226 and is adapted to be moved from a normally open position, when the phonograph is at rest, to a closed position in response to the advancing movements of the switch assembly 252—255 and associated parts imparted to it by the selecting levers 226 and push buttons 234, and remains closed until the last record of a selected group has been brought into play, at which time the return movement of the switch assembly is such as to again open such switch. To accomplish these ends, this switch 309 is controlled by a tappet arm 314 radially mounted on the outer end of one of the journals 256 of the switch assembly, such arm having its outer end in the path of the movable element of said switch to normally hold it open, while upon the turning movement of the switch assembly to sequence selecting positions, as called for by the selecting levers 226 operated, the tappet arm recedes from the movable yieldable element of the switch 309 and causes it to close by spring pressure. The companion switch 310 is controlled by a part of the record-changing mechanism so as to be closed during the playing-period of a record and automatically opened at a predetermined time, as when a played record has been restored to its initial position in the record-magazine, and remains open until the next record is brought out for play, when it is again closed. To accomplish these ends, the movable, yieldable element of the switch 310 is disposed in the operating path of the master-cam-operated lever 95 which governs the movements of the rock members 80 to in turn control the releasing and gripping movements of the magazine-clamping jaws 71 and the swinging of the record-gripper-supports 134 to and from engagement with the records. When this lever is rocked by the master cam 50 from the playing position shown in Figure 8 to the non-playing position shown in Figure 5, in which latter position the jaws are engaged and the gripper-supports released, said lever encounters the movable element of the switch 310 and opens it. Should no other records be registered for play, the phonograph will then stop, because at such time the companion selective-controlled switch 309 is also opened. However, should other records be registered for play, the motor circuit will remain closed through such companion switch 309, which, under such conditions, is still closed, and remains closed until the last record of a selected group has been positioned for play, at which time said switch is automatically opened.

The circuit including the electromagnets 299 for actuating the rocker arms 288 to project their stop elements 130 into the path of the magazine stop dog 131 to arrest the magazine at the selected record stations consists of the selector lever and push button controlled switch elements 252, 253, each of the elements 253 being connected by the companion wire 300 to one end of the coil of the companion electromagnet. The other end of this coil is connected to a feed wire 315, common to the several electromagnets, which is connected to the terminal of a normally closed switch 316, the other terminal thereof being connected by a branch wire 317 to the wire 312 leading to one terminal of the transformer 311. This circuit is then completed, depending on whether a given selector lever 226 is pushed forwardly or backwardly to play an even-numbered recording, that is, the recording on one side or the other of the selected record, through the closing of the companion pair of switch elements 252, 253 by the respective push button 234 which was depressed for selection. One of the switch elements 252 of a pair, controlled by one or the other of adjoining push buttons associated with each selector lever 226, is connected by a wire 318, common to the whole group of such switch elements, to a relay 319 for governing the playing of the odd-numbered selections or one side of a selected record, while the companion switch element of a given pair is connected to a like common wire 320 to a similar relay 321 for governing the playing of the even-numbered selections or the opposite side of a selected record. Each of these relays is connected to a wire 322 which leads through a wire 323 and 324 to the other terminal of the transformer, thereby completing the circuit established by a depressed selector lever 226. When the odd relay 319 is energized to play one side of a record, it closes pairs of relay-contacts 325 and 326 which control the selected side of the record to be played. Included in the circuit of the pair of contacts 325 is a switch having two sets of contacts 327 and 328 which is adapted to be closed at a predetermined time by the master cam 50 through the medium of a projection 329 formed thereon. Leading from the set of switch contacts 327 are wires 330 and 331, the wire 330 being connected to one terminal of the transformer 311 and the companion wire 331 being connected to one of the relay-contacts 325 of each relay 319 and 321, the companion contacts thereof being connected by wires 332 and 333, respectively, with the companion odd and even-governing coils of the doubling-acting solenoid 204, the other end of each coil thereof being connected to the wires 323 and 324 leading to the other terminal of the transformer. Thus, when a given selector lever 226 is moved to a select position, say, to play the odd-numbered side of that record, the companion switches 252 and 253 are closed by the affected button 234 to, first, set the magazine at the record-selecting station in the manner heretofore described, and, secondly, to energize the companion odd relay 319 to close the contacts 325 and 326 thereof and accordingly energize the companion odd coil of the solenoid 204 to shift its plunger 205 in a direction to operate the vertically-swinging crank 197 in a direction to position the laterally-adjustable slide plate 191 so as to effect the swivelling movements of the record-grippers 136 in a direction to present the odd-numbered side of the record for play. Reversely, should the even-numbered side be selected, the even coil of solenoid 204 is correspondingly rendered operative to effect a transposition of the slide plate 191 and associated parts to present such side of the record for play. It should be stated here, however, that the circuit of the solenoid 204 for governing the playing of one side or the other of the record is not completed until the projection 329 on the master cam 50 has reached a radial position for closing the switch contacts 327, 328.

Leading from the set of switch contacts 328 are wires 334 and 335, the wire 334 being connected to one of the contacts 326 of the relays 319 and 321. Branching from wire 334 in advance of its connection to the relay-contacts is a wire 336 which is connected to the conductor bar 296 associated with the selective terminal posts 294. The wire 335 is connected to the record-repeating coil 215$^a$ of the double-acting solenoid 215. In a selected position, the bar 296 is connected across the companion post 294 by the bridge bar 297 to complete the circuit through the coil 215$^a$ governed by the switch-contacts 328. This circuit emanates from the transformer 311 through wire 337 to wire 330 and contacts 327 and then through wire 331 to the coil 215$^a$ and through wire 335 to contacts 328 to wires 334, 336 and to conductor bar 296, bridge bar 297 and corresponding terminal post 294 and back through wire 324 to the other terminal of the transformer.

Operatively associated with the double-acting solenoid actuated lever 206, which initiates the setting of the plate 191 for governing the playing of one side or the other of the selected record, are switches 338 and 339, the switch 339 being closed by said lever 206 when such plate 191 is in position for playing the odd-numbered side of the record, at which time the other switch 338 is open and vice versa. One set of companion elements of these switches are connected by a wire 340 to one side of a cam-actuated switch 341, the other side of the latter being connected to the wire 335. The other set of companion elements of the switches 338 and 339 are connected to the companion contacts 326 of the relays 321 and 319, respectively. Disposed alongside the switch 341 is a switch 342 which is connected in parallel with the switch 327, one contact of said switch 342 being also connected to wire 331 while its other contact is also connected to wire 337.

Associated with the tone arm, for initiating the return of a record to the magazine after play, is a switch including a fixed contact 343 and a movable contact 344 controlled by a tappet arm 345 movable with the tone arm, the movable contact being connected by a wire 346 with one end of the cancel-coil 215$^b$ of the double-acting solenoid 215, while the other end of said coil is connected by a wire 347 with the transformer 311. The fixed switch contact 343 is connected by a wire 348 to wire 337 leading to the other terminal of the transformer.

The normally closed switch 316, which is included in the circuit of the selector magnets 299, functions to de-energize said magnets when the tone arm is in playing engagement with a record, and is moved to open position for that purpose at a predetermined time by the lever 171 associated with the tone arm moving mechanism.

In the at rest position of the phonograph, the gear 48 is clutched to the companion worm wheel 44 to rotate the master cam 50 in a clockwise direction. When a record is selected and the motor is started by the closing of the switch 309, the master cam momentarily revolves in a clockwise direction to effect the shifting of the clutch mechanism to then turn the cam in a counter-clockwise direction, in which direction the cam rotates during the selective-transferring and positioning movements of a record for play. This shifting of the clutch mechanism, to release the clutched gear 48 from its worm wheel and engage the gear 47 with its worm wheel to turn the master cam in a counter-clockwise direction, is effected at a predetermined time by the then leading pin 225 on the underside of the cam encountering the rock arm 221, which reverses the position of the gear-shifting lever 216 from that shown in Figure 12. During a single revolution of the master cam in a counter-clockwise direction, the record magazine is shifted to record-selecting position, the magazine is split horizontally to provide for turntable clearance, the record is turned from a vertical to a horizontal playing position in one direction or the other depending on which side the selected recording is arranged, the turntable is lifted to the elevation of the record, and the tone arm swung inwardly and dropped onto the record for play. When the tone arm is swung in for play, the counter-clockwise movement of the master cam is arrested by its pin 224 tripping the rock arm 221 to neutral position so that the cam is at rest during the playing of the record. When the playing of the record is completed, the tone arm closes the switch 343, 344 to energize the cancelling coil 215$^b$ of the solenoid 215 to rock the lever 216 and associated parts from neutral position to the reverse clutch-engaged position to rotate the master cam in a clockwise direction for restoring the parts to their initial position with the played record returned to the magazine.

When the projection 329 of the master cam contacts the switches 327, 328 during its counter-clockwise movement, it momentarily closes them by an impulse contact to energize one or the other of the coils of the double-acting solenoid 204 so as to actuate the plate 191 to govern the positioning of the record for properly playing its selected side. Thereafter, the cam continues in its counter-clockwise direction and while the projection 329 encounters the switches 341, 342, no further effect is produced. When the cam cycle has been completed, the clutch mechanism associated with the drive gears 47, 48 is shifted to neutral position and remains in such position during the playing of the record. If, after playing it, that record is to be repeated, then, on the initial clockwise movement of the cam 50, the cam-projection 329 closes the switch contacts 341, 342 which results in the companion coil of the double-acting solenoid 204, which was previously energized, to simply be energized again, while the coil 215$^a$ is energized to throw the clutch in a direction to turn the cam in a counter-clockwise direction. If the same selected record is to be then played on the opposite side, the initial clockwise movement of the cam closes the switches 341, 342 and causes the circuit including the other coil of the double-acting solenoid 204 to be established, but at that time the plate 191 is still locked in its previously set position and the solenoid is not capable of responding to its energization. Also, at this time the coil 215a is not energized due to the fact that the circuit is broken at the switch 338, so that the cam continues in its clockwise direction until its projection 329 encounters the switches 327, 329, which then causes the circuit of the solenoid 204 to be rendered active to shift the parts controlled thereby and to energize the coil 215a and cause the cam to rotate in its counter-clockwise direction to accomplish the record-changing act or that of presenting the record for play.

For the purpose of preventing the tone arm 153 overswinging the initial playing grooves of the record during the smart inward movement imparted to such arm by the upward stroke of its actuating member 162 as well as to retard its outward swing imparted thereto on the downward stroke of such member, I provide a brake bar 350 which is mounted on the tone arm standard 157 for limited vertical displacement into and out of braking position and which terminates at its upper end in a lateral flange 351 overhanging the adjoining base-flange of the tone arm bracket 155 and having a brake pad 352 on its bottom face, as shown in Figures 17 and 18. A spring 353 connected at one end to the standard and at its other end to the brake bar yieldingly urges the latter into braking position. Projecting from the brake bar is a laterally-bent trip lug 354 which is disposed in the elevating plane of the actuating member 162, so that at a predetermined time in the final upstroke of such member, as when the tone arm has been moved inwardly to its initial playing relation with a record, the top edge of that member encounters the trip lug and elevates the brake bar 350 out of braking engagement with the tone arm bracket 155. In the outward swung position of the tone arm in non-play position, the brake is engaged and remains engaged during the initial inward swing of the tone arm to its proper play-starting position to effectually prevent its over-travel by the smart thrust imparted to it during the swinging stroke of the actuating member 162.

In Figures 35, 36 and 37, I have shown a means which may be employed for readily facilitating the charging and removal of the records to and from the magazine, such means consisting of record-supporting plates 355 slidably mounted on the respective separators 67 for vertical movement between the same and relative thereto. At their lower ends these plates have lateral record-engaging seats 356, while centrally thereof they are provided with guides 357 which embrace uprights 358 constituting a part of the separators. At its upper end each plate has a shank or handle 359 whereby the user may manipulate it when charging or removing a record.

I claim as my invention:

1. An automatic phonograph, comprising a turntable, a partible record-magazine including separable record-supporting sections adjustably mounted for bodily movement relative to said turntable to a record-selecting position with a record in edgewise relation to the plane of the turntable, means disposed along the path of travel of said magazine for releasable supporting engagement with a selected record and for turning it to and from a horizontal play position over the turntable, and means releasably engageable with those portions of the magazine at opposite sides of the selected record for parting the magazine to provide a clearance space for the playing of the record.

2. An automatic phonograph, comprising a vertically-adjustable turntable movable to and from a record-playing position, a horizontally-displaceable magazine including separable members for supporting records in edgewise relation to the turntable and adapted for bodily movement over the turntable in its lowered position to a record-selecting position and adapted to be split into two separable sections at opposite sides of a record selected to provide a playing clearance for the turntable, record-gripping means disposed along the path of movement of the magazine and substantially transversely in line with the turntable-axis for releasably engaging a selected record and shifting it to and from a record-playing position over the turntable, and means for actuating the foregoing means in predetermined sequence.

3. An automatic phonograph, comprising a turntable, a partible record magazine including separable, record-supporting sections adjustable across the axial plane of the turntable to one or another of a plurality of selective positions relative to the latter and composed of a plurality of separators between which the records are supported in edgewise relation to the turntable, means for effecting a bodily movement of said magazine to and from its selective positions, record-gripping means disposed laterally of the path of travel of the magazine for movement into and out of gripping engagement with a selected record in the magazine for supporting it free of the latter and for shifting it to and from a horizontal position when the magazine is parted, means for effecting a parting of the magazine-separators at either side of a selectively-positioned record to provide a clearance for the playing record, and means for raising and lowering the turntable into and out of playing relation with a selectively-positioned record.

4. An automatic phonograph, comprising a turntable movable vertically to and from an elevated playing position, a horizontally-partible record magazine for supporting the records substantially upright in edgewise relation to the turntable and adjustable for movement to a selective position over the turntable to present a given record in the axial plane of the turntable, swiveled means movable into and out of edgewise gripping engagement with such selected record for supporting it independently of the magazine, when parted, and for turning it from a substantially upright to a horizontal playing position, and means for effecting the parting of the magazine at opposite sides of such selected record to provide space for swiveling the latter and for the elevation of the turntable to its playing position.

5. An automatic phonograph, comprising a turntable movable vertically to and from an elevated playing position, a horizontally-partible record magazine composed of alined upright separators between which the records are individually supported in edgewise relation to the turntable, means disposed for releasable clamping engagement with said magazine-separators as a unit to bodily shift them to and from one or another of a plurality of selective positions over the turntable to present a given record in the axial plane of the turntable, magazine-parting means disposed for releasable coupling engagement with those magazine-separators at opposite sides of a selectively-positioned record for shifting them in opposite directions to provide an operating clearance for the record during play and to restore said separators to their initial position after play, record-gripping means disposed laterally of the path of travel of the magazine transversely of the turntable-axis and pivoted to swing toward and from each other into and out of edgewise engagement with a selectively-positioned record for supporting it during the parting and restoring movements of the magazine, said gripping means being pivoted to swing a record to and from a horizontal playing position in the axial plane of the turntable, and means for actuating the foregoing means in predetermined sequence.

6. An automatic phonograph, comprising a turntable movable vertically to and from an elevated playing position, a horizontally-partible record magazine including a plurality of separable sections for supporting the records substantially upright in edgewise relation to the turntable and adjustable for movement to a selective position over the turntable to present a given record in the axial plane of the turntable, vertically-swinging arms positioned at opposite sides of the path of travel of the magazine substantially transversely in line with the turntable-axis for movement toward and from each other, record-gripping elements swiveled on said arms and adapted for edgewise supporting engagement with a selectively-positioned record for turning such record at predetermined times to and from a horizontal playing position, and magazine-parting means disposed for releasable coupling engagement with those sections of the magazine at opposite sides of the selectively-positioned record for shifting them in opposite directions at predetermined times to provide an operating clearance for the record during play and to restore the parted sections to their initial position after play.

7. An automatic phonograph, comprising a turntable movable vertically to and from an elevated playing position, a horizontally-partible record magazine including a plurality of separable sections for supporting the records substantially upright in edgewise relation to the turntable and adjustable for movement to a selective position over the turntable to present a given record in the axial plane of the turntable, vertically-swinging arms positioned at opposite sides of the path of travel of the magazine substantially transversely in line with the turntable-axis for movement toward and from each other, record-gripping elements swiveled on said arms, and adapted for edgewise supporting engagement with a selectively positioned record for turning such record at predetermined times to and from a horizontal playing position, means operatively engageable with said gripping elements for actuating them in one direction or the other to present one side or the other of the record for play, and magazine-parting means disposed for releasable coupling engagement with those sections of the magazine at opposite sides of the selectively-positioned record for shifting them in opposite directions at predetermined times to provide an operating clearance for the record during play and when turning the record to and from its play position and to restore the parted sections to their initial position after play.

8. A record magazine, comprising guide members, a plurality of individual separators for supporting records therebetween and slidably mounted thereon for bodily movement as a unit to and from a predetermined record-playing station and as split sections from and toward such station, means releasably engageable with said separators as a group for bodily shifting them to and from such station, and means releasably engageable with those separators at opposite sides of such station for splitting them into sections for movement in opposite directions to provide an operating playing clearance for the record so positioned and for restoring such split-sections together as a unit after playing the record.

9. A record magazine for phonographs, comprising a plurality of individual means disposed side by side for supporting records in a group in edgewise relation to the turntable, means for mounting said individual record-supporting means for movement in a plane transversely of the turntable-axis as a unit to present one or another of the records to a selective position in line with the turntable-axis and into split sections displaced at either side of the turntable, means releasably engageable with said individual record-supporting means for moving them as a unit in one direction or the other to and from a selective position in line with the turntable-axis, means releasably engageable with those record-supporting means disposed at either side of such selective position for splitting the group horizontally into sections to provide an operative playing clearance for the record so positioned and for restoring such split-sections together as a unit after play, and means operatively connected to both of said releasably-engageable means for governing their movements to and from their engaged positions in predetermined sequence.

10. A record magazine for phonographs, comprising a plurality of separators disposed side by side for removably supporting records edgewise therebetween in group-like fashion and having coupling lugs thereon, means for supporting said separators for bodily group movement to and from a predetermined selective station and for movement into split-sections at opposite sides of said station for providing a clearance space for playing a record, horizontally-reciprocating actuating means, respectively, engageable with certain of said separator-lugs for clamping the several separators as a unit for movement to the selective station, and for coupling engagement with other of said separator-lugs for splitting the group, and means for actuating said reciprocating means, respectively, in predetermined sequence to bodily shift and split the record-group.

11. A record magazine for phonographs, comprising a plurality of separators disposed side by side for removably supporting records edgewise therebetween in group-like fashion and having coupling lugs thereon, means for supporting said separators for bodily group movement to and from a predetermined selective station and for movement into split-sections at opposite sides of said station for providing a clearance space for playing a record, horizontally-reciprocating clamping jaws pivoted for movement into and out of embracing relation about certain of said separator-lugs for coupling the several separators as a unitary-moving group to and from a selective station, horizontally-reciprocating coupler bars disposed at opposite sides of such selective station and each having a row of longitudinal notches therein and pivoted for movement to bring such notches into and out of registering engagement with other of said separator-lugs for splitting the group to provide a playing clearance for a record, and means operatively engageable with said clamping jaws and said coupler bars for governing their movements into and out of their clamped and coupled positions, respectively, whereby when the clamping jaws are engaged the coupler bars are released and vice versa.

12. A record magazine for phonographs, comprising a plurality of separators disposed side by side for removably supporting records edgewise therebetween in group-like fashion and having coupling lugs thereon, means for supporting said separators for bodily group movement to and from a predetermined selective station and for movement into split-sections at opposite sides of said station for providing a clearance space for playing a record, horizontally-reciprocating clamping jaws pivoted for movement into and out of embracing relation about certain of said separator-lugs for coupling the several separators as a unitary-moving group to and from a selective station, horizontally-reciprocating coupler bars disposed at opposite sides of such selective station and each having a row of longitudinal notches therein and pivoted for movement to bring such notches into and out of registering engagement with other of said separator-lugs for splitting the group to provide a playing clearance for a record, springs operatively connected to said clamping jaws and said coupler bars for normally urging them to their clamped and coupled positions, respectively, and rock members disposed in operative relation to said jaws and coupler bars and having trip fingers thereon engageable with the latter for moving them to their released positions, one of the trip fingers of each rock member, when rocked in one direction, being engageable with the companion clamping jaw for swinging it to released position and the other trip finger moving to a receding position in a like direction to permit spring pressure to urge the companion coupler bar to its engaged position.

13. A record magazine for phonographs, comprising a plurality of separators disposed side by side for removably supporting records edgewise therebetween in group-like fashion and having coupling lugs thereon, means for supporting said separators for bodily group movement to and from a predetermined selective station and for movement into split-sections at opposite sides of said station for providing a clearance space for playing a record, and opposing, horizontally-reciprocating clamping jaws and coupler bars disposed in operative relation with said separators, the clamping jaws being releasably engageable with certain of said separator-lugs at one time for clamping the several separators as a unit, and the coupler bars being releasably engageable with other of said separator-lugs at another time for controlling the splitting of the group.

14. An automatic phonograph, comprising a vertically-adjustable turntable movable to and from an elevated playing position, a horizontally movable group of records including separable record-supporting sections disposed edgewise relative to the turntable for movement thereover in its lowered position, horizontally-shiftable means releasably engageable with said record-group for bodily moving it to and from a selective position with a given record in the axial plane of the turntable, and a second horizontally-shiftable means disposed parallel to said first-named means for movement toward and from the turntable-axis and releasably engageable with those sections of the record-group at either side of a given record-selected position for splitting the group to provide a clearance space for the playing of such record.

15. An automatic phonograph, comprising a vertically-adjustable turntable movable to and from an elevated playing position, a horizontally movable group of records including separable record-supporting sections disposed edgewise relative to the turntable for movement thereover in its lowered position, horizontally-shiftable means releasably engageable with said record-group for bodily moving it to and from a selective position with a given record in the axial plane of the turntable, a second horizontally-shiftable means disposed parallel to said first-named means for movement toward and from the turntable-axis and releasably engageable with those sections of the record-group at either side of a given record-selected position for splitting the group to provide a clearance space for the playing of such record, and swiveled record-engaging means disposed laterally of the path of travel of the record-group and substantially in the transverse plane of the turntable-axis and movable laterally into and out of supporting engagement with a selectively-positioned record for turning it at predetermined times into and out of playing relation with the turntable.

16. An automatic phonograph, comprising a vertically-adjustable turntable movable to and from an elevated playing position, a horizontally movable group of records including separable record-supporting sections disposed edgewise relative to the turntable for movement thereover in its lowered position, horizontally-shiftable means releasably engageable with said record-group for bodily moving it to and from a selective position with a given record in the axial plane of the turntable, a second horizontally-shiftable means disposed parallel to said first-named means for movement toward and from the turntable-axis and releasably engageable with those sections of the record-group at either side of a given record-selected position for splitting the group to provide a clearance space for the playing of such record, swiveled record-engaging means disposed laterally of the path of travel of the record-group and substantially in the transverse plane of the turntable-axis and movable laterally into and out of supporting engagement with a selectively-positioned record for turning it into and out of playing relation with the turntable, a sound-reproducing unit movable in the space provided by the split portions of the group in playing engagement with the selected record, and a master drive cam having connections between the same and said turntable, said first and second horizontally-shiftable means, said swiveled means and said reproducing unit for controlling the movements of such parts in predetermined sequence.

17. An automatic phonograph, comprising a vertically-adjustable turntable movable to and from an elevated playing position, a horizontally-adjustable group of records including separable record-supporting sections disposed edgewise relative to the turntable for movement thereover in its lowered position, horizontally-shiftable means releasably engageable with said record-group for bodily moving it to and from a selective position with a given record in the axial plane of the turntable, a second horizontally-shiftable means disposed parallel to said first-named means for movement toward and from the turntable-axis and releasably engageable with those sections of the record group at either side of a given record-selected position for splitting the group to provide a clearance space for the playing of such record, swiveled record-engaging means disposed laterally of the path of travel of the record-group and substantially in the transverse plane of the turntable-axis and movable laterally into and out of supporting engagement with a selectively-positioned record for turning it from its group-assuming position into and out of a horizontal playing position, oscillatory means operatively associated with said swiveled record-engaging means for turning them in one direction or the other to expose one side or the other of the record for play, and means operatively connected to said oscillatory means for governing their movements to play one side or the other of the record.

18. An automatic phonograph, comprising a turntable, a horizontally-partible record magazine including a plurality of separable sections for supporting the records in edgewise relation to the turntable and adjustably mounted for bodily movement to and from a predetermined record-selecting station relative to the turntable and adapted to be split at such station to provide an operating clearance for the transfer of a selected record to a playing position, means engageable with said record-supporting sections for bodily shifting them as a unitary stack to and from such record-selecting station, means engageable with at least those supporting sections at one side of the selecting station for splitting the stack into spaced units to provide an operating clearance for the record so positioned and for restoring such split units together as a complete stack after playing the record, and means disposed along the path of travel of the magazine in predetermined relation to the record-selecting station and releasably engageable with a selectively positioned record for transfering it from the magazine into horizontal playing relation with the turntable.

19. In an automatic phonograph, a turntable, a group of records disposed edgewise to the plane of the turntable for movement to and from record-selecting positions axially over the turntable, and record-engaging means normally positioned outwardly beyond the path of travel of the group for movement into and out of edgewise-supporting engagement with a selected record and for turning the record over into a plane parallel to the turntable to play one side or the other of the record, said means including opposing arms fulcrumed to swing vertically about axes parallel to the path of travel of the record-group and record-grippers swiveled on said arms to swing about an axis at substantially right angles to said first-named axes.

20. In an automatic phonograph, a turntable, a group of records disposed edgewise to the plane of the turntable for movement to and from record-selecting positions axially over the turntable, and record-engaging means normally positioned outwardly beyond the path of travel of the group for movement into and out of edgewise-supporting engagement with a selected record and for turning the record over into a plane parallel to the turntable to play one side or the other of the record, said means including opposing arms fulcrumed to swing vertically about axes parallel to the path of travel of the record-group, record-grippers swiveled on said arms to swing about an axis at substantially right-angles to said first-named axis and having pinions thereon, rock levers fulcrumed on said arms and having gear racks thereon engaging the companion gripper-pinions for turning the grippers in one direction or the other, and means operatively connected to said rock levers for selectively controlling the swiveling movements of said grippers.

21. In an automatic phonograph, a turntable, a group of records disposed edgewise to the plane of the turntable for movement to and from record-selecting positions axially over the turntable, and record-engaging means disposed at diametrically opposite sides of the turntable clear of the path of travel of the group and including opposing arms fulcrumed to swing vertically into and out of record-engaging position about axes parallel to the such path of travel and having record-grippers swiveled thereon to swing about an axis at substantially right angles to said first-named axis for turning a record into and out of a playing position, means acting on said arms for constantly urging them to a non-gripping position, and means operatively connected to said arms for swinging them to a record-gripping position.

22. In an automatic phonograph, a turntable, supports pivoted at opposite sides of the turntable for movement toward and from each other to record-engaging and releasing positions, record-gripper elements having trunnions journaled on said supports for edgewise gripping engagement with opposite sides of a record in the contracted position of such supports and for turning the record to and from playing position relative to the turntable, pinions applied to the gripper-element-trunnions, and rock levers pivoted to said supports for movement in a plane at substantially right angles to the pivotal movement of said supports, and having rack portions engaging the companion pinions for actuating them in directions to turn the gripper elements in directions to present the record to and from playing positions.

23. In an automatic phonograph, a turntable, supports pivoted at opposite sides of the turntable for movement toward and from each other to record-engaging and releasing positions, record-gripper elements swivelly mounted on said supports for edgewise gripping engagement with diametrically opposite sides of a record in the contracted position of such supports and for turning the record to and from a playing position relative to the turntable, means operatively connected to said gripper elements for actuating them about their pivots to and from a record playing position, and selectively adjustable means operatively associated with the gripper-actuating means for predetermining the rocking movements of the grippers in one direction or the other to expose one side or the other of the record for play.

24. In an automatic phonograph, a turntable, supports pivoted at opposite sides of the turntable for movement toward and from each other to record-engaging and releasing positions, record-gripper elements swivelly mounted on said supports for edgewise gripping engagement with diametrically opposite sides of a record in the contracted position of such supports and for turning the record to and from a playing position relative to the turntable, and means operatively connected to said gripper elements for actuating them in one direction or the other about their pivots from a record playing position, said means including a selectively adjustable element movable to one or the other of two selected positions.

and an actuating member disposed in operative relation to said adjustable element for coupling engagement therewith in one or the other of its selective positions for initiating its movement in one direction or the other for governing the turning of the gripper elements in correspondingly like directions.

25. In an automatic phonograph, a turntable, supports pivoted at opposite sides of the turntable for movement toward and from each other to record-engaging and releasing positions, record-gripper elements swively mounted on said supports for edgewise gripping engagement with diametrically opposite sides of a record in the contracted position of such supports and for turning the record to and from a playing position relative to the turntable, and means operatively connected to said gripper elements for actuating them in one direction or the other about their pivots to and from a record playing position, said means including a longitudinally-reciprocating element pivoted for adjustable lateral displacement to one or the other of two selected positions, and motion-transmitting means disposed for operative coupling engagement with said adjustable element in one or the other of its selective positions for predetermining its reciprocating movement in one direction or the other to accordingly actuate the grippers in like directions to play one side or the other of the record.

26. In an automatic phonograph, a turntable, supports pivoted at opposite sides of the turntable for movement toward and from each other to record-engaging and releasing positions, record-gripper elements swively mounted on said supports for edgewise gripping engagement with diametrically opposite sides of a record in the contracted position of such supports and for turning the record to and from a playing position relative to the turntable, and means operatively connected to said gripper elements for actuating them in one direction or the other about their pivots to and from a record playing position, said means including a longitudinally-reciprocating element pivoted for adjustable lateral displacement to one or the other of two selective positions, said element having notches in the opposite longitudinal edges thereof, and a rock lever pivoted intermediate its ends adjacent said element and having companion coupling pins thereon at opposite sides of its pivot and adapted for coupling engagement with one or the other of said notches in one or the other of the selective positions of said element for predetermining the reciprocating movement of the latter.

27. In an automatic phonograph, a turntable, supports pivoted at opposite sides of the turntable for movement toward and from each other to record-engaging and releasing positions, record-gripper elements swively mounted on said supports for edgewise gripping engagement with diametrically opposite sides of a record in the contracted position of such supports and for turning the record to and from a playing position relative to the turntable, and means operatively connected to said gripper elements for actuating them in one direction or the other about their pivots to and from a record playing position, said means inc ding a longitudinally-reciprocating element pivoted for adjustable lateral displacement to one or the other of two selective positions, selectively-controlled means operatively connected to said element for shifting it to one or the other of its selective positions, and motion-transmitting means disposed for releasable coupling engagement with said adjustable element in one or the other of its selective positions for predetermining its recpirocating movements.

28. In an automatic phonograph, a turntable, supports pivoted at opposite sides of the turntable for movement toward and from each other to record-engaging and releasing positions, record-gripper elements swively mounted on said supports for edgewise gripping engagement with diametrically opposite sides of a record in the contracted position of such supports and for turning the record to and from a playing position relative to the turntable, and means operatively connected to said gripper elements for selectively actuating them in one direction or the other about their pivots to and from a position to expose one side or the other of the record for play, said means comprising a rock lever having coupling pins thereon at opposite sides of its pivot, a longitudinally-reciprocating and laterally-displaceable element pivotally and slidably disposed in operative relation to said rock lever between its coupling pins and having notches in its opposing longitudinal edges companion to such pins for providing a releasable driving connection between said lever and said element, selectively-controlled means operatively connected to said element for laterally displacing it to one or another of two selected positions with one of its notches in registered engagement with the companion coupling pin, means for transmitting motion to said rock lever at predetermined time to govern the operative reciprocating movements of said element, and operative connections between said element and said gripper elements for actuating them in accordance with the selective longitudinal movement of such element.

29. In an automatic phonograph, a turntable, supports pivoted at opposite sides of the turntable for movement toward and from each other to record-engaging and releasing positions, record-gripper elements swively mounted on said supports for edgewise gripping engagement with diametrically opposite sides of a record in the contracted position of such supports and for turning the record to and from a playing position relative to the turntable, a longitudinally-reciprocating plate having operative connections to said gripper elements for swinging them in one direction or the other in response to the fore and aft movements of such plate, the latter being pivoted for lateral displacement to and from one or the other of two selected positions, an actuating member disposed in operative relation to said selective, reciprocating plate for releasable coupling engagement therewith in one or the other of its selective positions for initiating its movement in one direction or the other, and means for selectively positioning said plate including a crank operatively connected thereto and in relative sliding engagement therewith, and selectively-controlled means operatively connected to said crank for moving it in one direction or the other to predetermine the selective positioning of said plate.

30. In a phonograph, a record magazine, a turntable, means for transferring records from said magazine to a position for operative engagement with the turntable and back again including supports having record grippers thereon and pivoted at opposite sides of the turntable for movement toward and from each other to record-engaging and releasing positions, springs acting on said supports for urging them to record-gripping position, rock members adjoining the pivots of said supports and normally engaging the same for holding them in their record-released position, and cam-actuated means operatively connected to said rock members for swinging them at predetermined times into and out of holding engagement with said supports.

31. In a phonograph, a record magazine, a turntable, means for transferring records from said magazine to a position for operative engagement with the turntable and back again including supports having record grippers thereon and pivoted at opposite sides of the turntable for movement toward and from each other to record-engaging and releasing positions, springs acting on said supports for urging them to record-gripping position, means engageable with said supports at predetermined times for controlling their movements into and out of engagement with a record during its transfer to and from the magazine, a tone arm, means for moving the tone arm into and out of playing position, opposing tie connections extending from said supports and pivoted to each other at their inner ends, and cam means operatively connected to said tone arm moving means and engageable with one of said tie connections for governing the outward and inward movement of said supports.

32. In a phonograph, a record magazine for supporting different-sized records, a turntable, means for transferring records from said magazine to a position for operative engagement with the turntable and back again including supports having record grippers thereon and pivoted at opposite sides of the turntable for movement toward and from each other to record engaging and released positions, a tone arm having means for moving it to and from operative positions with different sized records, means movable with the tone arm to one or another of a plurality of pre-set positions and disposed in the operative path of one of said gripper-supports when in gripping engagement with one size or another of a record for arresting and predetermining the inward swing of the tone arm in pre-setting relation with a given sized record, and other means disposed in the path of said means movable with the tone arm for arresting and predetermining the inward swing of the tone arm in pre-setting relation with another sized record.

33. In a phonograph, a record magazine for supporting different-sized records, a turntable, means for transferring records from said magazine to a position for operative engagement with the turntable and back again including supports having record grippers thereon and pivoted at opposite sides of the turntable for movement toward and from each other to record engaging and released positions, a tone arm having means for moving it to and from operative positions with different sized records, a tone arm positioning member movable with the tone arm to a plurality of positions for governing the inward swing of the tone arm in pre-setting relation with different sized records, and a plurality of means disposed in the moving path of said positioning member for arresting the inward swing of the tone arm to different positions, one of said arresting means being borne by one of said gripper supports and operative, when engaged with a given sized record, to arrest the inward swing of the tone arm, and inoperative when engaged with a different sized record, to arrest the inward swing of the tone arm.

34. In a phonograph, a record magazine for supporting different-sized records, a turntable, means for transferring records from said magazine to a position for operative engagement with the turntable and back again including supports having record grippers thereon and pivoted at opposite sides of the turntable for movement toward and from each other to record engaging and released positions, a tone arm having means for moving it to and from operative positions with different sized records, a tone arm positioning member movable with the tone arm to a plurality of positions for governing the inward swing of the tone arm in pre-setting relation with different sized records, and a plurality of means disposed in the moving path of said positioning member for arresting the inward swing of the tone arm to different positions, one of said arresting means being positioned to arrest the inward swing of the tone arm to a pre-set position for a small-sized record, and the other arresting means being borne by one of said gripper supports and operative, when engaged with a larger-sized record, to arrest the inward swing of the tone arm to its corresponding pre-set position relative to such record, said last-named arresting means being out of the path of said tone arm positioning member when the gripper-supports are positioned for engagement with a small-sized record.

35. The combination with a tone arm and an adjustable record engaging member adapted to be moved to one or the other of two positions for engaging two different sized records, of a tone arm positioning lever movable with the tone arm to one or the other of two positions in pre-setting relation to one or the other of such records, and a plurality of stop means corresponding to the different sized records disposed in the path of movement of said lever, one of said stops governing the positioning of the tone arm for pre-setting it in predetermined relation with the smaller-sized record, and the other stop means being applied to said adjustable record-engaging member and disposed to clear said lever in the adjustment of such member to engage the smaller-sized record and disposed in the path of such lever in the adjusted position of said member to engage a larger-sized record.

36. The combination with a tone arm and an adjustable record engaging member adapted to be moved to one or the other of two positions for engaging two different sized records, of a tone arm positioning lever movable with the tone arm to one or the other of two positions in pre-setting relation to one or the other of such records, a plurality of stop means corresponding to the different sized records disposed in the path of movement of said lever, one of said stops governing the positioning of the tone arm for pre-setting it in predetermined relation with the smaller-sized record, and the other stop means being applied to said adjustable record-engaging member and disposed to clear said lever in the adjustment of such member to engage the smaller-sized record and disposed in the path of such lever in the adjusted position of said member to engage a larger-sized record, means for yieldingly urging said lever to one or the other of its pre-setting positions, and means operatively connected to said lever for restoring it at a predetermined time to its intitial position.

37. In an automatic phonograph for playing different sized records, a combined vertically and horizontally-swinging tone arm having means for moving it horizontally to and from predetermined positions relative to different sized records, a tone arm positioning member movable with the tone arm, stop means disposed in the operating path of said positioning member for predetermining the inward swing of the tone arm relative to one-sized record or another, and supplementary means operatively connected to said tone arm for actuating it both horizontally and vertically from its pre-set position into engagement with the starting groove of the record to be played, said supplementary means consisting of a vertically-reciprocable cam element having substantially vertically and horizontally disposed cam faces thereon, and an operative connection between said cam element and said tone arm for transmitting horizontally and vertically-swinging movements thereto in response to the vertical displacement of the cam element.

38. In an automatic phonograph, a standard, a tone arm bracket swiveled thereon for horizontally-swinging movement, a tone arm mounted on said bracket, vertically-shiftable means operatively connected to said tone arm for governing its movement into and out of play-starting engagement with a record, a brake member guided on said standard in correlation with said vertically-shiftable means for movement into and out of braking engagement with the tone arm bracket, a spring for normally urging said brake to its operative position, and co-acting means associated with the vertically-shiftable tone arm moving means and the brake for automatically shifting the latter to its released position upon the tone arm reaching its play-starting position.

39. An automatic phonograph, comprising a turntable movable to and from a record-playing position, a partible record magazine including a plurality of separable, record-receiving pockets adjustably mounted for bodily movement relative to the turntable to and from a record-selecting position, means for parting the magazine at either side of the selected record, means for transferring a selected record from the magazine to a play position over the turntable and vice versa, a reversably movable master drive cam having connections between the same and said turntable, said magazine and said transfer means for automatically controlling the movements of said parts in predetermined sequence, clutch means connected with said cam for governing its movements in one direction or the other, and means operatively connected to said clutch for automatically controlling the same at predetermined times to drive the cam in one direction or the other.

40. An automatic phonograph, comprising a turntable movable to and from a record-playing position, a partible record magazine including a plurality of separable, record-receiving pockets adjustably mounted for bodily movement relative to the turntable to and from a record-selecting position, means for parting the magazine at either side of the selected record, means for transferring a selected record from the magazine to a play position over the turntable and vice versa, a reversibly movable master drive cam having connections between the same and said turntable, said magazine and said transfer means for automatically controlling the movements of said parts in predetermined sequence, clutch means connected with said cam for governing its movements in one direction or the other, means operatively connected to said clutch for automatically controlling the same at predetermined times to drive the cam in one direction or the other, said means including a clutch-actuating member, electrically-controlled means operatively connected to said lever for shifting the clutch at predetermined times to positions to drive the cam in one direction or the other, and complementary means applied to said cam and to said actuating member and disposed for relative engagement at predetermined times in the movement of the cam to shift the clutch at one time from an engaged to a neutral position and at another time to shift the clutch from one engaged position to a reversely-engaged position.

41. An automatic phonograph, comprising a turntable movable to and from a record-playing position, a partible record magazine including a plurality of separable, record-receiving pockets adjustably mounted for bodily movement relative to the turntable to and from a record-selecting position, means for parting the magazine at either side of the selected record, means for transferring a selected record from the magazine to a play position over the turntable and vice versa, a reversably movable master drive cam having connections between the same and said turntable, said magazine and said transfer means for automatically controlling the movements of said parts in predetermined sequence, clutch means connected with said cam for governing its movements in one direction or the other, means operatively connected to said clutch for automatically controlling the same at predetermined times to drive the cam in one direction or the other, said means including a clutch-actuating member, a solenoid operatively connected to said member for shifting the clutch in one direction or the other to drive the cam in corresponding directions, an electric circuit including said solenoid and switches disposed in operative relation to said cam for governing them at predetermined times to render the solenoid operative to shift the clutch to one position or the other, and complementary means applied to said cam and to said actuating member and disposed for relative engagement at predetermined times in the movement of the cam to shift the clutch at one time from an engaged to a neutral position and at another time to shift the clutch from one engaged position to a reversely-engaged position.

42. In a phonograph, a selectively-adjustable record magazine including a plurality of separable sections adapted for movement as a unit to a selective position and to be separated into two units at opposite sides of the record selected, a turntable, means including swiveling record grippers for transferring records in the magazine, when separated, to and from the turntable to play one side or the other thereof, means operatively connected to said magazine and said transfer means for initiating their selective, separating and transfer movements, respectively, stop members selectively projectible into the path of said magazine for arresting its movement in selected positions, and means operatively connected to the record grippers of said transfer means for selectively swiveling them to expose one side or the other of a record for play.

43. In a phonograph, a selectively-adjustable record magazine including a plurality of separable sections adapted for movement as a unit to a selective position and to be separated into two units at opposite sides of the record selected, a turntable, means including swiveling record grippers for transferring records in the magazine, when separated, to and from the turntable to play one side or the other thereof, means operatively connected to said magazine and said transfer means for initiating their selective separating and transfer movements, respectively, stop members selectively projectible into the path of said magazine for arresting its movement in selected positions, means operatively connected to the record grippers of said transfer means for selectively actuating them in a direction to expose one side or the other of a record for play, and a selector mechanism operatively connected to said stop members and to the actuating means of said swiveling grippers for governing such parts to selectively position a record and the side thereof to be played.

44. In a phonograph, a turntable, a partible record magazine composed of a plurality of separable sections adjustable relative to the turntable to one or another of a plurality of selective positions and adapted to be split into sections at opposite sides of the selected record, means for transferring records in the magazine to and from the turntable, means operatively connected to said magazine and said transfer means for initiating their selective-splitting and transfer movements in predetermined sequence, stop members selectively projectible into the path of the magazine for arresting its movement in selected positions, and a plurality of selector elements operatively connected to said stop members for controlling the selective positioning thereof.

45. In a phonograph, a turntable, a partible record magazine composed of a plurality of separable sections adjustable relative to the turntable to one or another of a plurality of selective positions and adapted to be split into sections at opposite sides of the selected record, means for transferring records in the magazine to and from the turntable to play one side or the other thereof, means operatively connected to said magazine and said transfer means for initiating their selective-splitting and transfer movements to play the selected side of the record selected, stop members selectively projectible into the path of the magazine for arresting its movement in selected positions, a selector mechanism including a plurality of selector elements corresponding in number to the records and each movable to one or another of two selective positions for controlling the selection of the record and the side thereof to be played, and operative connections between said selector elements and said stop members and transfer-initiating means for automatically governing the actuation thereof to selectively position the records for play.

46. In an automatic phonograph, the combination of a turntable, a selectively-adjustable record magazine movable relatively to the turntable to and from selective positions, means for transferring a selected record from the magazine to the turntable to play one side or the other thereof, electrically-controlled means for governing the selective positions of the magazine, electrically-controlled means for governing the transfer means to play the selected side of the record, and a selector unit for initiating the selective-governing movements of said electrically-controlled means, respectively, including a plurality of switch-controlling selector elements corresponding in number to the records in the magazine and movable to one or the other of two selective positions for selecting a record and the side thereof to be played, and switches operatively associated with each of said selector elements and included in the circuit of said electrically-controlled means, respectively, for predetermining the record and the side thereof to be played.

47. An automatic phonograph, comprising a selectively-adjustable record magazine movable to and from selective positions, and stop mechanism for controlling the same including a plurality of rocker stop members selectively projectible into the path of said magazine for arresting its movement in selected positions, a common pivot shaft for said stop members, a row of electromagnets disposed at one side of and below the axis of said pivot shaft in operative relation with certain of said stop members for projecting them to their selective stop positions, a second row of electromagnets disposed at the opposite side and above the axis of said pivot shaft in operative relation with other of said stop members for correspondingly projecting them to their selective stop positions, and means common to said stop members for automatically restoring them at a predetermined time to their initial positions.

48. An automatic phonograph, comprising a selectively-adjustable record magazine movable to and from selective positions, and stop mechanism for controlling the same including a plurality of rocker stop members selectively projectible into the path of said magazine for arresting its movement in selected positions, each of said stop members having an arm constituting an armature and another arm for restoring a projected member to its initial position, electromagnets companion to said stop members in operative relation with their respective armature-arms, and an actuating member common to and operatively associated with the restoring arms of said stop members for individually returning the latter at a predetermined time to their initial positions.

49. An automatic phonograph, comprising a selectively-adjustable record magazine movable to and from selective positions, and stop mechanism for controlling the same including a plurality of rocker stop members selectively projectible into the path of said magazine for arresting its movement in selected positions, each of said stop members having an arm constituting an armature and another arm for restoring a projected member to its initial position, electromagnets companion to said stop members in operative relation with their respective armature-arms, an actuating member common to and operatively associated with the restoring arms of said stop members for individually returning the latter at a predetermined time to their initial position, a third arm on each of said stop members, and a switch companion to and operatively controlled by each of said third arms whereby when the companion stop member is projected to a selective stop position its corresponding switch is closed and when such stop member is restored to its initial position such switch is opened.

50. An automatic phonograph, comprising a turntable, a partible record magazine including separable record-supporting portions movable relative to said turntable to and from a record-selecting position, and means disposed for operative engagement with those portions of the magazine at opposite sides of the selected record for parting the magazine at either side of the turntable to provide a clearance space for the playing of the record.

51. An automatic phonograph, comprising a turntable, a partible record magazine including separable record-supporting portions movable relative to said turntable to and from a record-selecting position, means disposed for operative engagement with those portions of the magazine at opposite sides of the selected record for parting the magazine at either side of the turntable to provide a clearance for the playing of the record, and means disposed in cooperative relation with the turntable and releasably engageable with a selected record for transferring it to the turntable for playing.

52. An automatic phonograph, comprising a vertically-adjustable turntable movable to and from an elevated playing position, a partible record magazine including separable record-supporting portions disposed at one side of the turntable for horizontal movement relative to the turntable, means engageable with one or another of the records for transferring it from the supporting members to an operative playing position with the turntable, when lowered, to and from a record-selecting station, means disposed for operative engagement with those portions of the magazine at opposite sides of the selected record for parting the magazine to provide a clearance space for the elevating movements of the turntable and the playing of the selected record, and means disposed at the record-selecting station for releasable engagement with a selected record for supporting and transferring it to a playing position on the turntable.

53. An automatic phonograph, comprising a turntable, a partible record magazine including separable record-supporting portions movable relative to said turntable to and from a record-selecting position, means disposed for operative engagement with those portions of the magazine at opposite sides of the selected record for parting the magazine at either side of the turntable to provide a clearance space for the playing of the record, and transfer means disposed substantially at the record-selecting position for supporting the selected record independently of the magazine, when parted and for presenting the record to the turntable to play one side or the other thereof.

54. In an automatic phonograph for reproducing one of a group of records, a record changing mechanism including a series of separable record supporting members for said group of records, a turntable, means engageable with one or another of the records for transferring it from the supporting members to an operative playing position with the turntable, means for bodily shifting said members for moving the group of records relative to the turntable and said transfer means to present thereto the record to be reproduced, and means for separating said members at the record to be reproduced to provide a clearance space over the turntable for transferring such record from its companion supporting members to a position in operative relation to the turntable.

55. In an automatic phonograph for reproducing one of a group of records, a record changing mechanism including a series of separable record supporting members for said group of records, a turntable, means for bodily shifting said members for moving the group of records relative to the turntable to present thereto the record to be reproduced, means for effecting a relative separation of said members at the record to be reproduced to provide a clearance space over the turntable for transferring such record from the group to the turntable, and means for placing the separated record in playing position on the turntable.

56. In an automatic phonograph for reproducing one of a group of records, a record changing mechanism including a series of separable record supporting members for said group of records, a turntable, means for bodily shifting said members for moving the group of records relative to the turntable to present thereto the record to be reproduced, means for moving said members from each side of said record and free of the turntable for separating the remaining records of the group therefrom, and means for elevating said turntable between the separated group of records to receive said record in playing position.

57. In an automatic phonograph for reproducing one of a group of records, a record changing mechanism including a series of slidably mounted record supporting and separating plates, each pair of adjacent plates adapted to receive a record therebetween, a turntable, means for bodily shifting all of said plates for moving the group of records relative to the turntable to a predetermined record-selective position, and means for moving said plates from each side of said record and free of the turntable for separating the remaining records of the group therefrom.

58. In an automatic phonograph for reproducing one of a group of records, a record changing mechanism including a series of slidably mounted upright, record supporting and separating plates, each pair of adjacent plates adapted to receive a record therebetween, a turntable, means for bodily shifting all of said plates for moving the group of records relative to the turntable to a predetermined record-selective position, means for separating said series of plates at the selected record to provide clearance space over the turntable, and means for withdrawing the selected record from its position in the series and placing it in playing position on the turntable.

59. In an automatic phonograph for reproducing one of a group of records, a record changing mechanism including a series of slidably mounted record supporting and separating plates, each pair of adjacent plates adapted to receive a record therebetween, a turntable, means for bodily shifting all of said plates for moving the group of records relative to the turntable to present one of said records thereto, means for moving said plates from each side of said record and free of the turntable for separating the remaining records of the group therefrom, and means for elevating said turntable between the separated group of records to receive said record in playing position.

60. In an automatic phonograph for reproducing one of a group of records, a record changing mechanism including a magazine composed of a plurality of separable record receiving pockets, a turntable supported at one side thereof, means for bodily shifting said magazine to and from a selective position relative to the turntable, means at such selective position for withdrawing a selected record from its pocket and for presenting it to the turntable for reproduction, and means for effecting a relative separation of the magazine pocket of such record to provide a clearance space for its presentation to the turntable and its reproduction thereon.

61. In an automatic phonograph for reproducing one of a group of records, a record changing mechanism including a magazine composed of a plurality of separable record receiving pockets, a turntable supported at one side thereof, means for bodily shifting said magazine past the turntable to position for presenting one of the records contained therein to the turntable for reproduction, means for separating the magazine pockets and moving them from each side of said record and turntable, and means for moving the turntable between the separated pockets of the magazine to position for receiving said record.

62. In an automatic phonograph, a record changing mechanism including a series of slidably mounted record supporting and separating plates, a turntable normally positioned below the path of travel of said plates, means for bodily moving said plates relative to and above the turntable to a predetermined position, means for separating said plates along the medial line of the turntable and moving such separated plates to opposite sides of the turntable, and means for elevating said turntable into playing position between the separated groups of plates.

63. In an automatic phonograph for reproducing one of a group of records, a record changing mechanism including a magazine having a plurality of separable members for supporting said records, means for bodily reciprocating said magazine members to position a selected record in a predetermined position relative to said turntable, means for separating said magazine members at each side of the selected record to release said record therefrom, and means for engaging and placing the released record in playing position on the turntable.

64. In an automatic phonograph for reproducing one of a group of records, a record changing mechanism including a reciprocating magazine having a plurality of separable, pocket-forming members for containing a plurality of records, a turntable, means for reciprocating said magazine over the turntable to position the record to be reproduced centrally thereabove, means for engaging and supporting said record independently of the magazine, means for separating the pocket-forming members of the magazine on each side of the selected record and moving them free of said turntable and to opposite sides thereof, and means for elevating said turnable to receive the individually supported record.

65. A record magazine for phonographs comprising a series of separable plates disposed side to side in parallel spaced relation for receiving and supporting individual records therebetween, a pair of the latter jointly constituting a pocket for receiving a record and each plate having shoulders adjacent its lower end and on opposite faces thereof to provide record-supporting seats, and means for slidably supporting said plates for reciprocable movement both individually and in groups.

66. A record magazine for phonographs comprising a plurality of separable plates disposed side to side in parallel relation, each of said plates having a portion thereof spaced from the corresponding portion of the adjacent plates for receiving individual records therebetween and another engageable portion for providing a record supporting shoulder, and means for slidably supporting said plates for reciprocable movement both individually and in groups.

67. A record magazine for phonographs comprising a series of separable plates disposed side to side in parallel spaced relation for receiving and supporting individual records therebetween, a pair of the latter jointly constituting a pocket for receiving a record and each plate having shoulders adjacent its lower end and on opposite faces thereof to provide record-supporting seats, means for slidably supporting said plates for reciprocable movement in groups, and projections formed on each of said plates extending into position to be engaged for effecting selective relative movement between said plates and groups thereof.

68. A record magazine comprising a plurality of separable members for containing individual records therebetween mounted on a support for bodily movement as a unit to and from a predetermined record selecting station, and as relatively split groups from and toward said station, means for bodily shifting said members as a unit and the records supported thereby to position a predetermined record at the selecting station, and means for splitting the magazine into groups at such station to provide playing clearance between said groups for said record so positioned, and for restoring said split groups together as a unit after the playing of said record.

69. In an automatic phonograph, a vertically movable turntable, means for positioning a record above said turntable, gripping elements pivotally positioned at diametrically opposite sides of said turntable for movement transversely thereof and adapted to grip diametrically opposite sides of said record, means for oscillating said elements to turn said record about its diametric axis with the center of the record in the axial projection of the turntable to present a predetermined side of the record in playing position, and means for elevating said turntable into engagement with the record when turned to playing position and lowering the turntable free of the record to permit it to be reversed by said elements or turned to non-playing position.

70. In an automatic phonograph, a vertically movable turntable, means for positioning a record above said turntable, gripping elements positioned at diametrically opposite sides of said turntable adapted to grip diametrically opposite sides of said record, means for oscillating said elements to turn said record about its diametric axis with the center of the record in the axial projection of the turntable to present a predetermined side of the record in playing position, means for elevating said turntable into engagement with the record when turned to playing position and lowering the turntable free of the record to permit it to be reversed by said elements or turned to non-playing position, and selectively adjustable means operably associated with said elements for predetermining the turning movements thereof in one direction or the other to present a predetermined side of the record for reproduction.

71. In an automatic phonograph, a record magazine, a turntable, means for transferring records of different size from said magazine into playing position on said turntable including record grippers movable into record engaging and releasing positions, a tone arm, means operatively connected to the tone arm for moving it from a pre-setting position relative to a given-sized record to a position over and into playing engagement with the starting groove of such record, and means for arresting the movement of the tone arm in its pre-setting position relative to a given-sized record depending upon the position of said record grippers when in record engagement, said arresting means including a tone arm positioning member operatively connected with the tone arm to move therewith and having arms projecting therefrom, a stop positioned in the moving path of one of said arms for arresting the tone arm in its presetting position to play a given sized record, and a stop applied to one of said record grippers and positioned in the moving path of the companion arm of said positioning member when the record grippers are engaged with a different-sized record to arrest the tone arm in its pre-setting position for playing such record.

72. In an automatic phonograph, a record magazine for supporting different sized records, a turntable, means for transferring records from said magazine to a position for operative engagement with the turntable and back again, including record grippers mounted for movement toward and from each other to record engaging and releasing positions, respectively, a tone arm having means for moving it over a definite path both horizontally and vertically to and from operative engagement with different sized records, and movable means operatively connected to the tone arm and governed by said grippers during movement to a record-engaging position for arresting and predetermining the inward movement of the tone arm to pre-setting relation with the given sized record engaged by said grippers.

73. In an automatic phonograph, a record magazine, a turntable, means for transferring records of different size from said magazine into playing position on the turntable including record grippers movable into record engaging and released positions, a tone arm mounted for horizontal and vertically swinging movement, means operatively associated with said tone arm and said record transfer means for governing the horizontal movement of the tone arm to a presetting position relative to a given record as determined by the inward movement of the grippers necessary to engage and grip such record, said means including a horizontally-swinging arm operatively connected with the tone arm for movement therewith, and a vertically-swinging latch operatively connected to said record-transfer means and disposed in the path of movement of said horizontally-swinging arm when the record grippers are engaged with a given-sized record to arrest the tone arm in its pre-setting position.

74. In an automatic phonograph, a selectively adjustable record magazine, a vertically movable turntable, means including swivelling record grippers disposed at opposite sides of the turntable and in the path of selective adjustment of the magazine for transferring a selected record from the magazine to and from the turntable to play one side or the other thereof, means operatively connected to said magazine and said transferring means for initiating their selective movements, selectively actuated elements for arresting the movement of the magazine in the selected position, means operatively connected to said record transferring means for selectively positioning the record relative to the turntable to present a selected side for playing, a reproducer above said turntable, and means for elevating the turntable for engaging said record to present said selected side thereof to said reproducer for reproduction.

75. In an automatic phonograph, the combination with a turntable, and a magazine comprising a group of records, of means for transferring a record from the group to a position above the turntable, means for turning the selected record above the turntable to play one side or the other thereof, electrically controlled means for governing the selection of the record from the group by the record transfer means, electrically controlled means for governing the record turning means to play a selected side of said record, and a selector unit for initiating the selective-governing movements of said electrically-controlled means, respectively, including a plurality of switch-controlling selector elements corresponding in number to the records in the magazine and movable to one or the other of two selective positions for selecting a record and the side thereof to be played, said switches being operatively associated with each of said selector elements and included in the circuit of said electrically-controlled means, respectively, for predetermining the record and the side thereof to be played.

THEODORE M. WRIGHT.